US012019408B2

(12) United States Patent
Yang et al.

(10) Patent No.: US 12,019,408 B2
(45) Date of Patent: Jun. 25, 2024

(54) WEARABLE PRODUCT

(71) Applicant: Huawei Technologies Co., Ltd., Shenzhen (CN)

(72) Inventors: Rongguang Yang, Dongguan (CN); Menglong Zhao, Dongguan (CN); Jie Li, Shenzhen (CN); Bing Liu, Xi'an (CN); Bin Zhang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 324 days.

(21) Appl. No.: 17/604,600

(22) PCT Filed: Apr. 14, 2020

(86) PCT No.: PCT/CN2020/084652
§ 371 (c)(1),
(2) Date: Oct. 18, 2021

(87) PCT Pub. No.: WO2020/211742
PCT Pub. Date: Oct. 22, 2020

(65) Prior Publication Data

US 2022/0197226 A1 Jun. 23, 2022

(30) Foreign Application Priority Data

Apr. 19, 2019 (CN) ......................... 201910317783.9

(51) Int. Cl.
*G04G 17/04* (2006.01)
*G04G 17/06* (2006.01)
(Continued)

(52) U.S. Cl.
CPC ........... *G04G 17/045* (2013.01); *G04G 17/06* (2013.01); *G04G 17/08* (2013.01); *G04R 60/12* (2013.01)

(58) Field of Classification Search
CPC ...... G04G 17/045; G04G 17/06; G04G 17/08; G04R 60/12
(Continued)

(56) References Cited

U.S. PATENT DOCUMENTS

2015/0173233 A1* 6/2015 Lu ..................... G02F 1/133308 361/728
2015/0378321 A1* 12/2015 Fraser .................... G04G 21/04 368/10
(Continued)

FOREIGN PATENT DOCUMENTS

CN 102809922 A 12/2012
CN 205334080 U 6/2016
(Continued)

*Primary Examiner* — Andargie M Aychillhum
(74) *Attorney, Agent, or Firm* — Conley Rose, P.C.

(57) ABSTRACT

A wearable product includes a display system, a rear housing, a middle frame, a printed circuit board, and a conductive component. The rear housing is located on a non-light-emitting side of the display system. The middle frame is located between the display system and the rear housing, and is a hollow frame structure. The middle frame includes a metal frame and a plastic frame nested in the metal frame and connected to the metal frame. The plastic frame is connected to the display system and the rear housing in a sealing manner to form an accommodation cavity. The printed circuit board is located in the accommodation cavity. A part of the conductive component is located in the accommodation cavity and electrically connected to the printed circuit board, and the other part of the conductive component passes through the plastic frame to be electrically connected to the metal frame.

20 Claims, 19 Drawing Sheets

(51) Int. Cl.
*G04G 17/08* (2006.01)
*G04R 60/12* (2013.01)

(58) Field of Classification Search
USPC .......................................................... 361/748
See application file for complete search history.

(56) References Cited

U.S. PATENT DOCUMENTS

| | | | | |
|---|---|---|---|---|
| 2015/0378487 | A1 * | 12/2015 | Meer | G04G 21/00 345/32 |
| 2018/0121079 | A1 | 5/2018 | Li et al. | |
| 2019/0148816 | A1 | 5/2019 | Chen et al. | |

FOREIGN PATENT DOCUMENTS

| | | | | | |
|---|---|---|---|---|---|
| CN | 106684528 | A | | 5/2017 | |
| CN | 206180087 | U | | 5/2017 | |
| CN | 107948349 | A | | 4/2018 | |
| CN | 108023164 | A | * | 5/2018 | G04R 60/02 |
| CN | 108023164 | A | | 5/2018 | |
| CN | 207427652 | U | | 5/2018 | |
| CN | 108429833 | A | | 8/2018 | |
| CN | 208706498 | U | | 4/2019 | |
| EP | 3944063 | A1 | | 1/2022 | |
| JP | H04331397 | A | | 11/1992 | |
| JP | 2002250783 | A | | 9/2002 | |
| JP | 2003294865 | A | | 10/2003 | |
| WO | 2015117647 | A1 | | 8/2015 | |

* cited by examiner

A1-A1

WEARABLE PRODUCT

CROSS-REFERENCE TO RELATED APPLICATIONS

This is a U.S. National Stage of International Patent Application No. PCT/CN2020/084652 filed on Apr. 14, 2020, which claims priority to Chinese Patent Application No. 201910317783.9 filed on Apr. 19, 2019. Both of the aforementioned applications are hereby incorporated by reference in their entireties.

TECHNICAL FIELD

This application relates to the field of display technologies, and in particular, to a wearable product.

BACKGROUND

With continuous development of display technologies, a user requires higher about an appearance and performance of a wearable product. To improve user experience for the product, a housing of the wearable product may usually use a metal material, so that the wearable product has a relatively good metallic texture. However, to improve signal quality of an antenna in the wearable product, a metal part in the housing of the wearable product needs to be segmented, and segments of the metal part are connected by using an insulating material. In this way, it is difficult to implement metal integration of the appearance of the product.

SUMMARY

Embodiments of this application provide a wearable product, to resolve a problem that metal integration cannot be implemented on a housing of a mobile terminal.

To achieve the foregoing objectives, the following technical solutions are used in this application:

According to a first aspect, an embodiment of this application provides a wearable product. The wearable product includes a display module, a rear housing, a middle frame, a printed circuit board (printed circuit board, PCB), and a conductive component. The rear housing is located on a non-light-emitting side of the display module. The middle frame is located between the display module and the rear housing. The middle frame includes a metal frame and a plastic frame nested in the metal frame and connected to the metal frame. The metal frame and the plastic frame are both hollow frame structures. The plastic frame is connected to the display module and the rear housing in a sealing manner to form a closed accommodation cavity. The PCB is located in the accommodation cavity. Apart of the conductive component is located in the accommodation cavity and electrically connected to the PCB, and the other part of the conductive component passes through the plastic frame to be electrically connected to the metal frame. It may be learned from the foregoing that, in the wearable product provided in this embodiment of this application, a part that is of the plastic frame located on an inner side of the middle frame and that faces the display module is connected to the display module in a sealing manner. In addition, a part that is of the plastic frame and that faces the rear housing is further connected to the rear housing in a sealing manner. In this way, the plastic frame, the display module, and the rear housing form a complete waterproof structure. The accommodation cavity used for accommodating the PCB is in the waterproof structure. The metal frame connected to the plastic frame is outside the waterproof structure. In this way, there is a risk for water leakage due to relatively small bonding force between the outer metal frame and the inner plastic frame in the middle frame. Based on a waterproof function of the waterproof structure located on an inner side of the metal frame, a probability that external water vapor enters into the waterproof structure can be effectively reduced, thereby reducing a probability of affecting another component in the accommodation cavity of the wearable product, thereby improving waterproof performance of the wearable product. In addition, the metal frame located on an outer side of the middle frame of the wearable product provided in this embodiment of this application is used as an antenna radiator. The metal frame is separated from a component with a metal part in the wearable product by using the plastic frame. In this way, a distance between the metal frame and an inner metal component such as the PCB, that is, antenna clearance can be effectively increased through adjusting a wall thickness of the plastic frame. Greater antenna clearance indicates better antenna performance of the metal frame and better transmission effect of an antenna signal. In addition, the metal frame located on the outer side of the middle frame may be a hollow frame structure whose head and tail are connected. Therefore, for the metal frame, when effective transmission of the antenna signal is met, an appearance of the product may be enabled to meet a requirement for metal integration. In addition, a part of the middle frame is the metal frame, and another part of the middle frame is the plastic frame. Therefore, in comparison with a middle frame fully made of metal, the middle frame provided in this embodiment of this application has a lighter weight, to reduce a weight of the entire wearable product and implement a light design for the entire product.

Optionally, a first through hole is disposed on the plastic frame. The conductive component includes a metal spring, a metal connector, and a first seal kit. The metal spring is in contact with the PCB. One end of the metal connector passes through the first through hole to be in contact with the metal frame, and the other end of the metal connector is in contact with the metal spring. A first annular mounting groove is disposed on a surface that is of a part of the metal connector passing through the first through hole and that cooperates with the first through hole. The first seal kit is located in the first mounting groove and is in contact with a bottom surface of the first mounting groove and a hole wall of the first through hole. In the conductive component, one end of the metal connector is electrically connected to the metal frame, and the other end is electrically connected to the metal spring. The metal spring is electrically connected to the PCB. In this way, the metal frame can be electrically connected to the PCB by using the conductive component, so that the metal frame can be used as an antenna to transmit a signal. In addition, the first seal kit is configured to seal the metal connector and the first through hole. Therefore, an impact from the metal connector passing through the plastic frame can be reduced for the waterproof performance of the waterproof structure including the plastic frame, and the display module and the rear housing connected to the plastic frame.

Optionally, a first connection hole connected to the first through hole is disposed on the metal frame. A part of the metal connector extending through the first through hole is located in the first connection hole and cooperates with the first connection hole. In this case, the part of the metal connector extending through the first through hole may be located in the first connection hole and cooperate with the first connection hole, to increase a contact area between the metal connector and the metal frame.

Optionally, the first connection hole is a threaded hole. The metal connector is a first threaded fastener. The first threaded fastener includes a bare rod and a screw rod that are connected. The bare rod cooperates with the first through hole in a sealing manner, and the screw rod cooperates with the first connection hole in a threaded manner. A diameter of the bare rod is greater than a diameter of the screw rod. In this case, the first seal kit may be mounted in the first mounting groove on the bare rod in the metal connector, and cooperation between the bare rod and the first through hole is implemented in the sealing manner by using the first seal kit. In addition, the screw rod cooperates with the first connection hole in the threaded manner, so that the first threaded fastener can be connected to the metal frame. In addition, in the metal connector, the diameter of the bare rod may be greater than the diameter of the screw rod, so that an intersection face between the bare rod and the screw rod can be in contact with an inner wall that is of the metal frame and that faces the accommodation cavity. In this way, the bare rod is prevented from being screwed into the first connection hole on the metal frame.

Optionally, the first threaded fastener further includes a head. The head is located in the accommodation cavity and connected to the bare rod. The metal spring includes a first sub-spring and a second sub-spring. The first sub-spring is provided with a second through hole. The bare rod passes through the second through hole to fasten the first sub-spring between the head and the plastic frame. The second sub-spring is connected to the first sub-spring to be an integrated structure. The second sub-spring is in contact with the PCB. A diameter of the head in the metal connector is greater than the diameter of the bare rod. Therefore, when the bare rod passes through the first through hole on the plastic frame, the head is located in the accommodation cavity located on an inner side of the plastic frame. In this case, the first sub-spring in the metal spring may be fastened between an inner wall of the plastic frame and the head by using the head, to electrically connect the metal connector to the metal spring. In addition, the second sub-spring that forms the integrated structure with the first sub-spring is in contact with the PCB, so that the metal frame can be electrically connected to the PCB by using the first threaded fastener and the metal spring.

Optionally, the display module includes a display screen and a bezel disposed around a periphery of the display screen. The wearable product further includes an adhesive layer. The adhesive layer is located on a surface that is of the plastic frame and that faces the bezel, and is used to bond the plastic frame and the bezel. In this way, the plastic frame and the bezel are connected by using the adhesive layer, so that the plastic frame is in close contact with the bezel. In this way, a probability that external water vapor enters into the accommodation cavity from a bonding position between the plastic frame and the bezel can be reduced, to improve a waterproof capability of the entire wearable product.

Optionally, a second mounting groove is disposed on a surface that is of the rear housing and that faces the plastic frame. The wearable product further includes a second seal kit. The second seal kit is located in the second mounting groove and is in contact with a surface that is of the plastic frame and that faces the second mounting groove and a bottom surface of the second mounting groove. The second seal kit is configured to seal the plastic frame and the rear housing. The wearable product further includes at least one second threaded fastener. The second threaded fastener is located on a side that is of the second seal kit and that is away from the accommodation cavity. The second threaded fastener passes through the rear housing and the plastic frame to be connected to the display module in a threaded manner. In this way, the rear housing may be connected to the plastic frame in a sealing manner by using the second threaded fastener and the second seal kit located between the rear housing and the plastic frame.

Optionally, a wall thickness of the plastic frame is 0.4 mm to 1.6 mm. When the wall thickness of the plastic frame is less than 0.4 mm, in a nano molding technology, a problem of insufficient molding easily occurs due to relatively few plastic materials. In addition, when the wall thickness of the plastic frame is greater than 1.6 mm, in a nano molding technology, materials are easily stacked in some regions of the surface of the plastic frame due to so many plastic materials. The regions of the stacked materials shrink, that is, a molding shrinkage phenomenon occurs, thereby reducing quality of the product. Therefore, when the wall thickness of the plastic frame is within the range of 0.4 mm to 1.6 mm, in the nano molding technology, a probability that insufficient molding occurs can be reduced, and a probability that molding shrinkage occurs can be reduced.

Optionally, the wearable product further includes a button component. A third through hole is disposed on the middle frame. In addition, the button component includes a button tube and a third seal kit. A part of the button tube is located in the third through hole, and a part of the button tube is located on the outer side of the middle frame. A third annular mounting groove is disposed on a surface that is of the button tube and that cooperates with the third through hole. The third seal kit is located in the third mounting groove and is in contact with a bottom surface of the third mounting groove and a hole wall of a part of the third through hole passing through the plastic frame. The third seal kit is configured to seal the button tube and the third through hole. In this way, the button tube and the plastic frame may be sealed by using the third seal kit. Therefore, an impact from the button tube passing through the plastic frame can be reduced for the waterproof performance of the waterproof structure including the plastic frame, and the display module and the rear housing connected to the plastic frame.

Optionally, the button component further includes a button cap and a button pole. The button cap is nested on a part that is of the button tube and that is located on the outer side of the middle frame. The button pole passes through an inner hole of the button tube and is connected to the button tube and the button cap. The button cap is configured to facilitate a user to control the button component. The button pole is connected to the button cap. The button pole is configured to: when the button cap is pressed or rotated, follow a press or rotation operation on the button cap, so that a component connected to the button pole in the wearable product performs an instruction corresponding to the foregoing operation, to implement control on a watch, for example, adjust time and read information.

Optionally, the inner hole of the button tube includes a first inner sub-hole and a second inner sub-hole that are connected. An aperture of the first inner sub-hole is greater than an aperture of the second inner sub-hole. The first inner sub-hole is disposed near the button cap. A fourth annular mounting groove is disposed on a cylinder surface of a part of the button pole extending into the accommodation cavity. In addition, the button component further includes a spring, a steel sheet, and a clip ring. The spring is mounted on the button pole and located in the first inner sub-hole. When the user presses the button cap, pressure exerted on the button cap causes the spring to be deformed. When the pressure disappears, the button component is reset to a position before the pressure, after the spring is restored from the deformation. The steel sheet is located between the spring and an intersection face between the second inner sub-hole and the first inner sub-hole. The fourth through hole is disposed on the steel sheet for the button pole to pass through. The steel sheet has a large rigidity, to avoid scratching an inner wall of the button tube during the deformation of the spring under the pressure. The clip ring is mounted in the fourth mounting groove. A surface that is of the clip ring and that faces a side wall of the middle frame is in contact with the plastic frame and a side surface of the fourth mounting groove. Therefore, positions of the button pole and the button tube are fixed by using the clip ring.

Optionally, a surface that is of the metal frame and that faces the plastic frame is a first stepped surface. The first stepped surface has at least one first protrusion and at least one first groove. A surface that is of the plastic frame and that faces the metal frame is a second stepped surface. The second stepped surface has at least one second protrusion and at least one second groove. The first protrusion is clamped into the second groove, and the second protrusion is clamped into the first groove, so that the metal frame is connected to the plastic frame.

Optionally, a surface that is of the metal frame and that faces the plastic frame has a plurality of nano-holes. The nano-holes are filled with a part of the plastic frame. An aperture of the nano-hole is at a nano level. In the foregoing nano molding technology, stronger bonding force can be implemented between the metal frame and the plastic frame.

Optionally, a plurality of circuit board feedpoints are disposed on the PCB. The wearable product includes a plurality of conductive components, One conductive component is electrically connected to one circuit board feedpoint. Therefore, parts of the metal frame that are electrically connected to different conductive components may be used to transmit different types of antenna signals.

REFERENCE NUMERALS

01. Wearable product; 10. Display module; 11. Rear housing; 12. Middle frame; 13. PCB; 120. Metal frame; 121.

Plastic frame; 100. Accommodation cavity; 50. Conductive component; 51. Metal spring; 52. Metal connector; 520. First mounting groove; 53. First seal kit; 1211. First through hole; 1202. First connection hole; 521. Head; 522. Bare rod; 523. Screw rod; 510. First sub-sprint; 1212. Second through hole; 511. Second sub-spring; 101. Display screen; 103. Backlight module; 102. Bezel; 30. Adhesion layer; 110. Second mounting groove; 32. Second seal kit; 42. Second threaded fastener; 200. Waterproof structure; 1201. Convex lug; 60. Button component; 1213. Third through hole; 601. Button tube; 6011. First inner sub-hole; 6012. Second inner sub-hole; 6010. Third mounting groove; 602. Third seal kit; 603. Button cap; 604. Button pole; 605. Spring; 606. Steel sheet; 607. Clip ring; 6040. Fourth mounting groove; 608. Fourth seal kit; 21. First protrusion; 22. First groove; 23. Second protrusion; 24. Second groove; 25. Nano-hole.

DESCRIPTION OF EMBODIMENTS

The following describes the technical solutions in embodiments of this application with reference to the accompanying drawings in the embodiments of this application. It is clear that the described embodiments are merely a part rather than all of the embodiments of this application.

The following terms "first" and "second" are merely intended for a purpose of description, and shall not be understood as an indication or implication of relative importance or implicit indication of a quantity of indicated technical features. Therefore, a feature limited by "first", "second", or the like may explicitly or implicitly includes one or more features. In the description of this application, unless otherwise stated, "a plurality of" means two or more than two.

In addition, in this application, position terms such as "top" and "bottom" are defined relative to positions of components in the accompanying drawings. It should be understood that these position terms are relative concepts used for relative description and clarification, and may correspondingly change according to changes in the positions of the components in the accompanying drawings.

In this application, it should be noted that the term "connection" should be understood in a broad sense unless otherwise expressly specified and limited. For example, the "connection" may be a fixed connection, or may be a detachable connection, or may be an integral connection; may be a direct connection, or may be an indirect connection implemented by using a medium.

An embodiment of this application provides a wearable product. The wearable product may be a watch or a band. For ease of description, the following embodiments are described by using an example in which the wearable product is a watch.

Figure 1A:
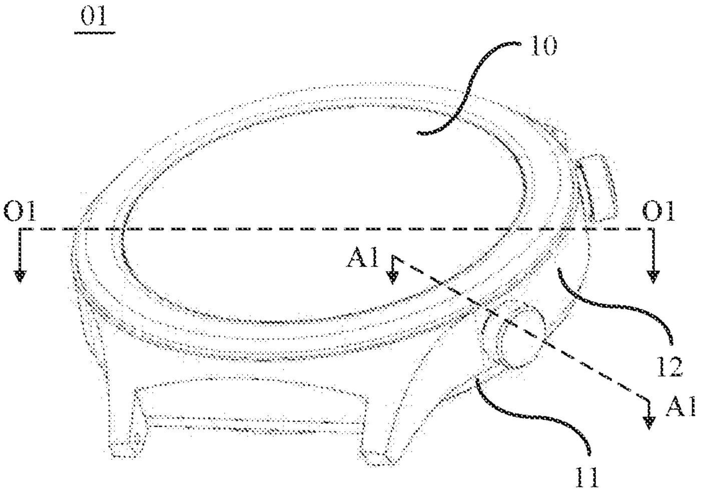
FIG. 1*a* is a schematic diagram of a structure of a wearable product according to some embodiments of this application.

As shown in FIG. 1*a*, a wearable product 01 includes a display module 10, a middle frame 12, and a rear housing 11.

Figure 1B:
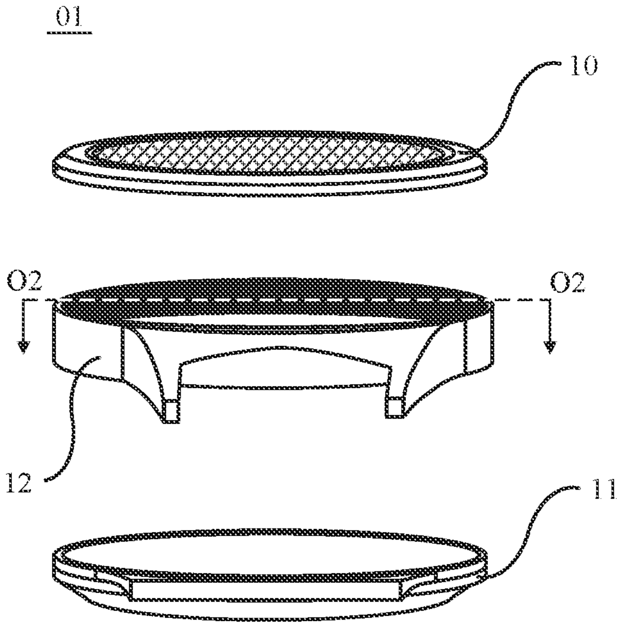
FIG. 1*b* is a schematic diagram of a position relationship between components of the wearable product in FIG. 1*a;*

The display module 10 has a light-emitting side configured to display a picture and a non-light-emitting side opposite to the light-emitting side. As shown in FIG. 1*b*, the rear housing 11 is located on the non-light-emitting side of the display module 10.

Figure 2A:
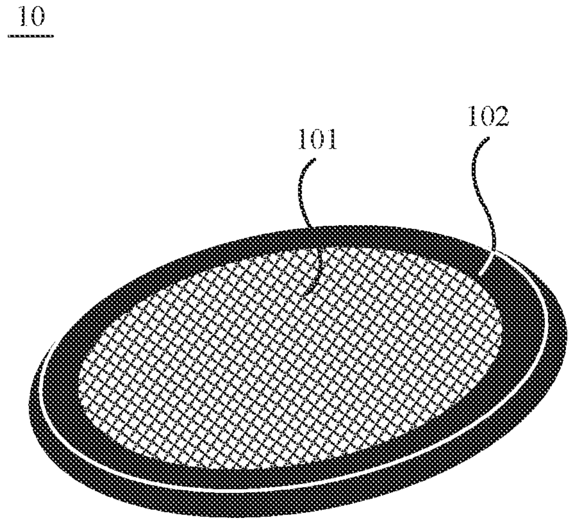
FIG. 2*a* is a schematic diagram of a structure of a display module in FIG. 1*a;*

As shown in FIG. 2*a*, the display module 10 includes a display screen 101 and a bezel 102. The bezel 102 is disposed around a periphery of the display screen 101. The bezel 102 may protect and decorate the periphery of the display screen 101.

Figure 2B:
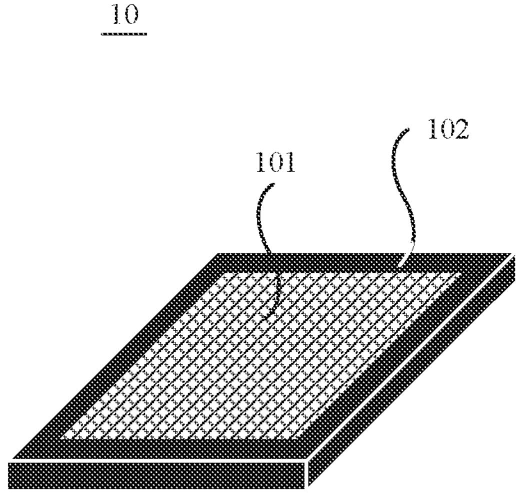
FIG. 2*b* is another schematic diagram of a structure of a display module in FIG. 1*a;*

It should be noted that a shape of the display screen 101 is not limited in this application. For example, a display surface of the display screen 101 may be a circle as shown in FIG. 2*a*, or may be a rectangle shown in FIG. 2*b*.

When the shape of the display screen 101 changes, a shape of another component of the wearable product 01, for example, the bezel 102, the middle frame 12, and the rear housing 11, also changes with the display screen 101. For ease of description, the following is described by using an example in which the display surface of the display screen 101 is a circle.

Figure 3:
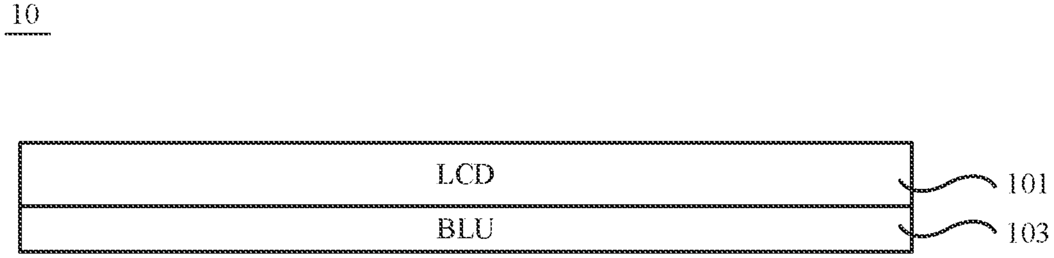
FIG. 3 is a schematic diagram of a structure of a display module in FIG. 1*a;*

In some embodiments of this application, as shown in FIG. 3, the display screen 101 may be a liquid crystal display (liquid crystal display, LCD). In this case, the display module 10 further includes a backlight unit (backlight unit, BLU) 103 that is configured to provide a light source for the liquid crystal display.

Alternatively, in some other embodiments of this application, the display screen 101 may be an organic light-emitting diode (organic light emitting diode, OLED) display screen. The OLED display screen can implement independent light emission. Therefore, the BLU 103 does not need to be set for the display module 10.

Figure 4:
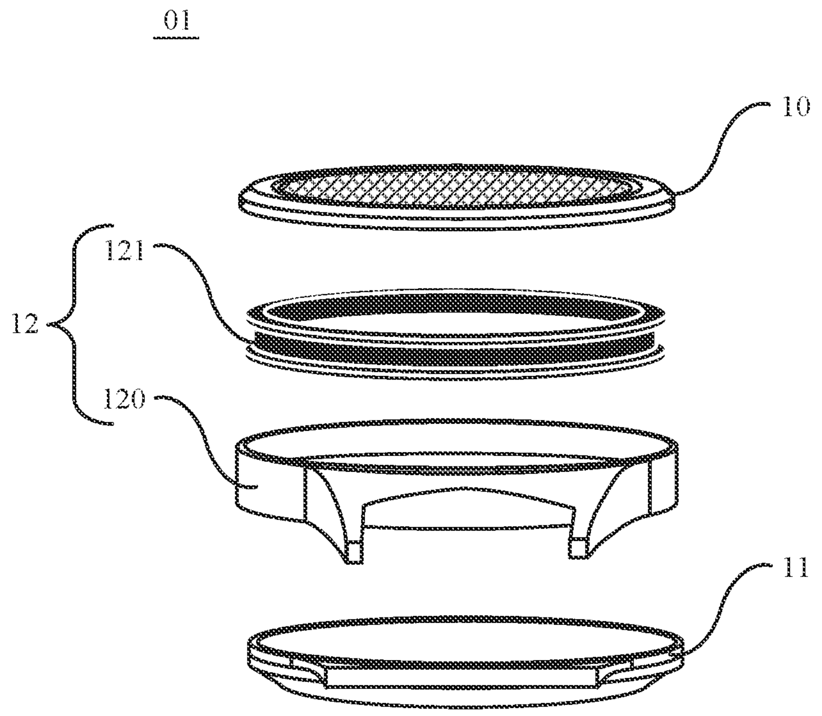
FIG. 4 is a schematic diagram of another position relationship between components of the wearable product in FIG. 1*a;*

In addition, as shown in FIG. 1*b*, the middle frame 12 is disposed between the display module 10 and the rear housing 11. In this embodiment of this application, as shown in FIG. 4, the middle frame 12 includes a metal frame 120 and a plastic frame 121. The plastic frame 121 is nested in the metal frame 120 and connected to the metal frame 120. The metal frame 120 and the plastic frame 121 are both hollow frame structures. Therefore, the entire middle frame 12 is also a hollow frame structure.

The metal frame 120 is made of a metal material. Therefore, the metal frame 120 has conduction performance. The plastic frame 121 is made of a plastic material, and has insulation performance.

When the display surface of the display screen 101 is a circle, the hollow frame structure may be a ring. The ring is a closed structure whose head and tail are connected.

Figure 5A:
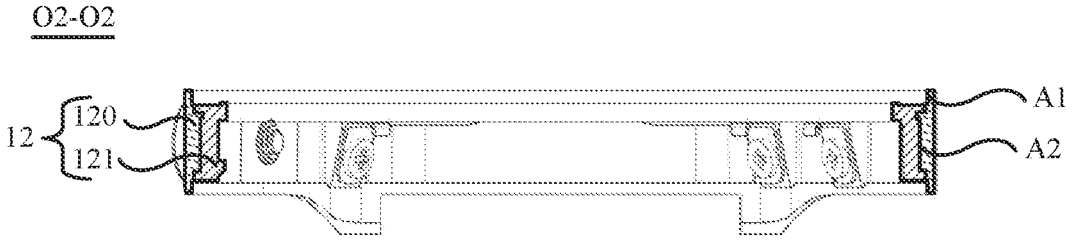
FIG. 5*a* is a cutaway drawing along O2-O2 in FIG. 1*b;*

In some embodiments of this application, in order that the metal frame 120 is connected to the plastic frame 121, as shown in FIG. 5*a* (a cutaway drawing along a dashed line O2-O2 in FIG. 1*b*), a surface that is of the metal frame 120 and that faces the plastic frame 121 is a first stepped surface A1. A surface that is of the plastic frame 121 and that faces the metal frame 120 is a second stepped surface A2. The first stepped surface A1 cooperates with the second stepped surface A2.

Figure 5B:
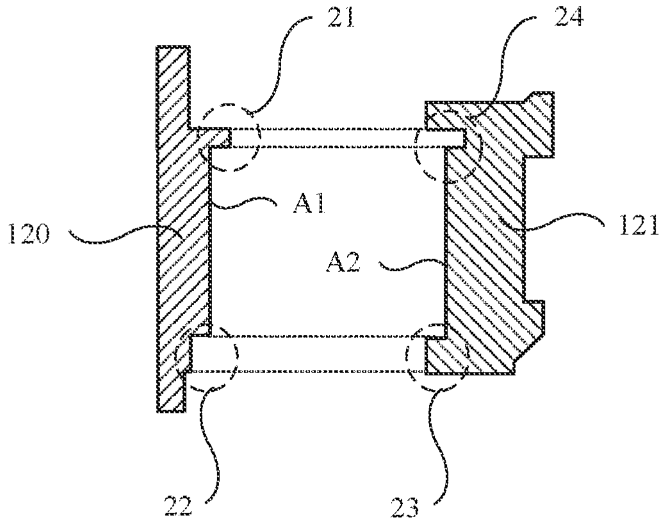
FIG. 5*b* is a schematic diagram of cooperation between contact surfaces of a metal frame and a plastic frame in FIG. 5*a;*

A partial sectional structure of the metal frame 120 and the plastic frame 121 is shown in FIG. 5*b*. The first stepped surface A1 that is of the metal frame 120 and that faces the plastic frame 121 has at least one first protrusion 21 and at least one first groove 22.

The second stepped surface A2 that is of the plastic frame 121 and that faces the metal frame 120 has at least one second protrusion 23 and at least one second groove 24.

The first protrusion 21 is configured to be clamped into the second groove 24, and the second protrusion 23 is configured to be clamped into the first groove 22, so that the metal frame 120 is connected to the plastic frame 121.

Alternatively, in some other embodiments of this application, the metal frame 120 may be combined with the plastic frame 121 by using a nano molding technology (nano molding technology, NMT), so that the metal frame 120 is connected to the plastic frame 121.

Figure 6:
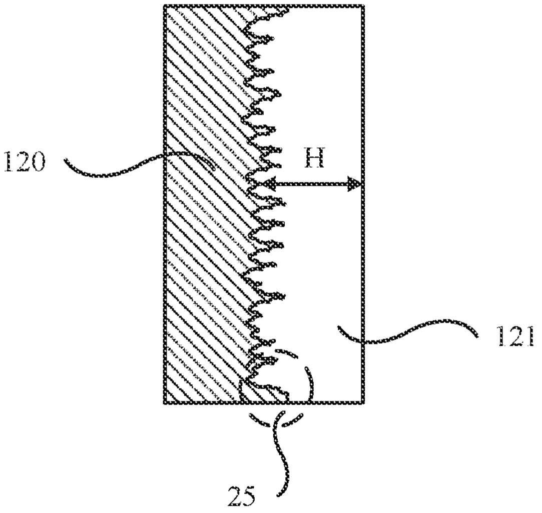
FIG. 6 is a schematic diagram of cooperation between contact surfaces of a metal frame and a plastic frame in a middle frame according to some embodiments of this application.

In this case, as shown in FIG. 6, a surface that is of the metal frame 120 and that faces the plastic frame 121 has a plurality of nano-holes 25. The nano-holes 25 are filled with a part of the plastic frame 121. An aperture of the nano-hole

25 is at a nano level. In the foregoing NMT, stronger bonding force can be implemented between the metal frame 120 and the plastic frame 121.

On this basis, in some embodiments of this application, a wall thickness H of the plastic frame 121 may be within a range of 0.4 mm to 1.6 mm. When the wall thickness H of the plastic frame 121 is less than 0.4 mm, in the nano molding technology, a problem of insufficient molding easily occurs due to relatively few plastic materials.

In addition, when the wall thickness H of the plastic frame 121 is greater than 1.6 mm, in the nano molding technology, materials are easily stacked in some regions of a surface of the plastic frame 121 due to so many plastic materials. The regions of the stacked materials shrink, that is, a molding shrinkage phenomenon occurs, thereby reducing quality of the product.

Therefore, when the wall thickness H of the plastic frame 121 is within the range of 0.4 mm to 1.6 mm, in the nano molding technology, a probability that insufficient molding occurs can be reduced, and a probability that molding shrinkage occurs can be reduced.

In some embodiments of this application, the wall thickness H of the plastic frame 121 may be 0.4 mm, 0.5 mm, 0.7 mm, 1.0 mm, 1.2 mm, 1.5 mm, or 1.6 mm.

It should be noted that the surface that is of the plastic frame 121 and that faces the metal frame 120 and the surface that is of the plastic frame 121 and that is opposite to the metal frame 120 are not flat surfaces due to factors such as a manufacturing process or a structure setting. In this case, the wall thickness H of the plastic frame 121 may be an average value of straight-line distances between the surface that is of the plastic frame 121 and that faces the metal frame 120 and the surface that is of the plastic frame 121 and that is opposite to the metal flame 120.

Figure 7A:
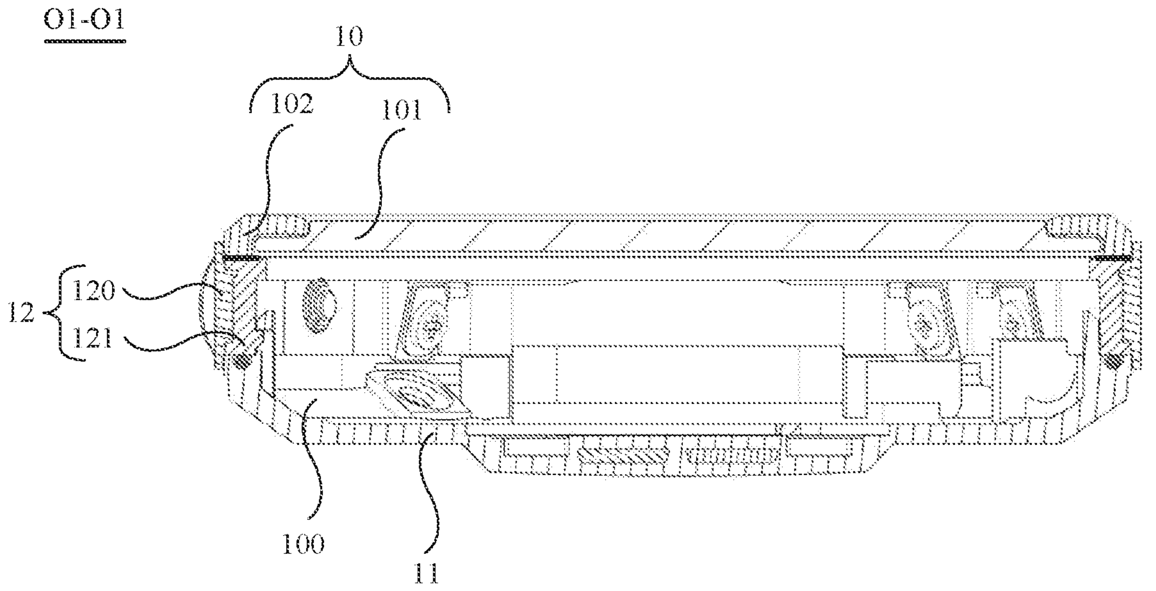
FIG. 7*a* is a cutaway drawing along O1-O1 in FIG. 1*a;*

In addition, as shown in FIG. 7*a* (a cutaway drawing along O1-O1 shown in FIG. 1*a*), in some embodiments of this application, in the middle frame 12, a part that is of the plastic frame 121 and that faces the display module 10 is connected to the display module 10 in a sealing manner, and a part that is of the plastic frame 121 and that faces the rear housing 11 is connected to the rear housing 11 in a sealing manner, to form a closed accommodation cavity 100.

Figure 7B:
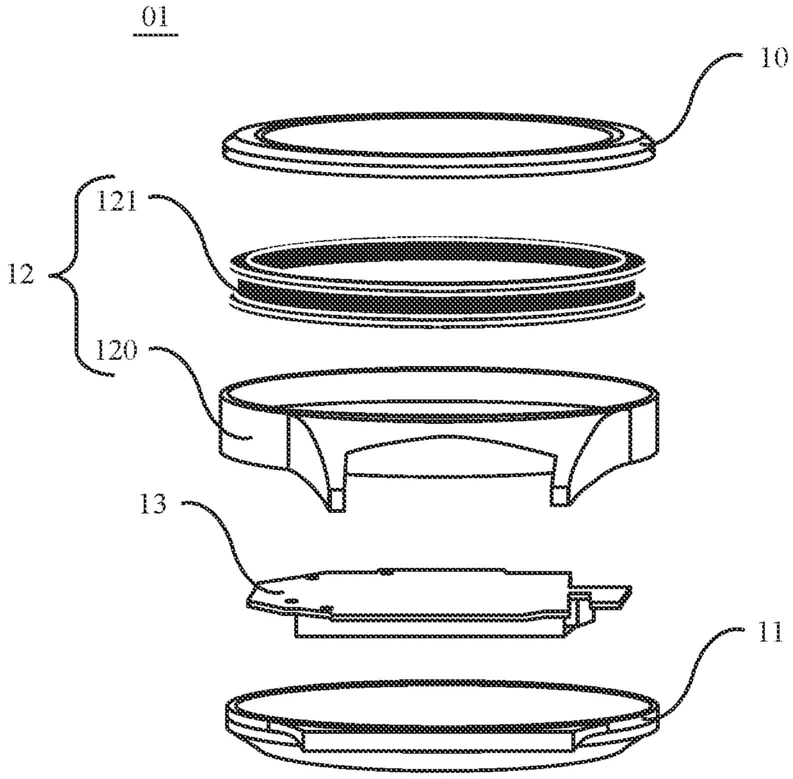
FIG. 7*b* is a schematic diagram of another position relationship between components of the wearable product in FIG. 1*a;*
Figure 7C:
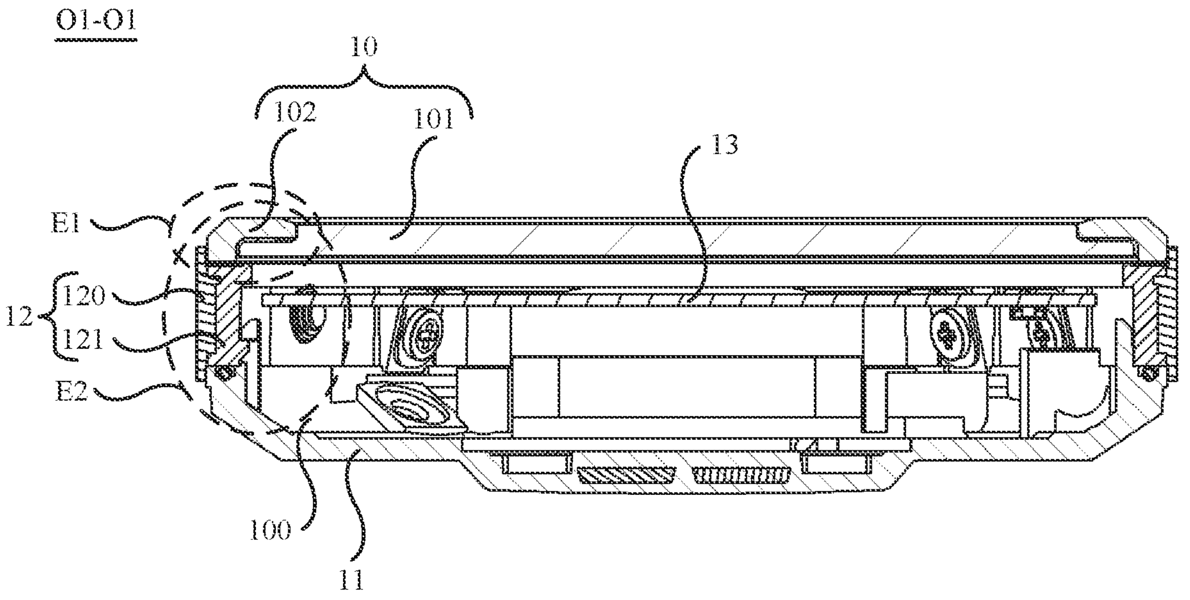
FIG. 7*c* is another cutaway drawing along O1-O1 in FIG. 1*a;*

The wearable product 01 further includes a PCB 13 shown in FIG. 7*b*. As shown in FIG. 7*c*, the PCB 13 is disposed in the accommodation cavity 100.

In addition, when the wearable product 01 further includes a battery (not shown in the figure), the battery may also be located in the accommodation cavity 100.

On this basis, when the closed accommodation cavity 100 has good waterproof performance, a probability that an electronic component such as the PCB 13 or the battery located in the accommodation cavity 100 encounters water can be reduced, thereby improving waterproof performance of the wearable product 01.

Figure 8A:
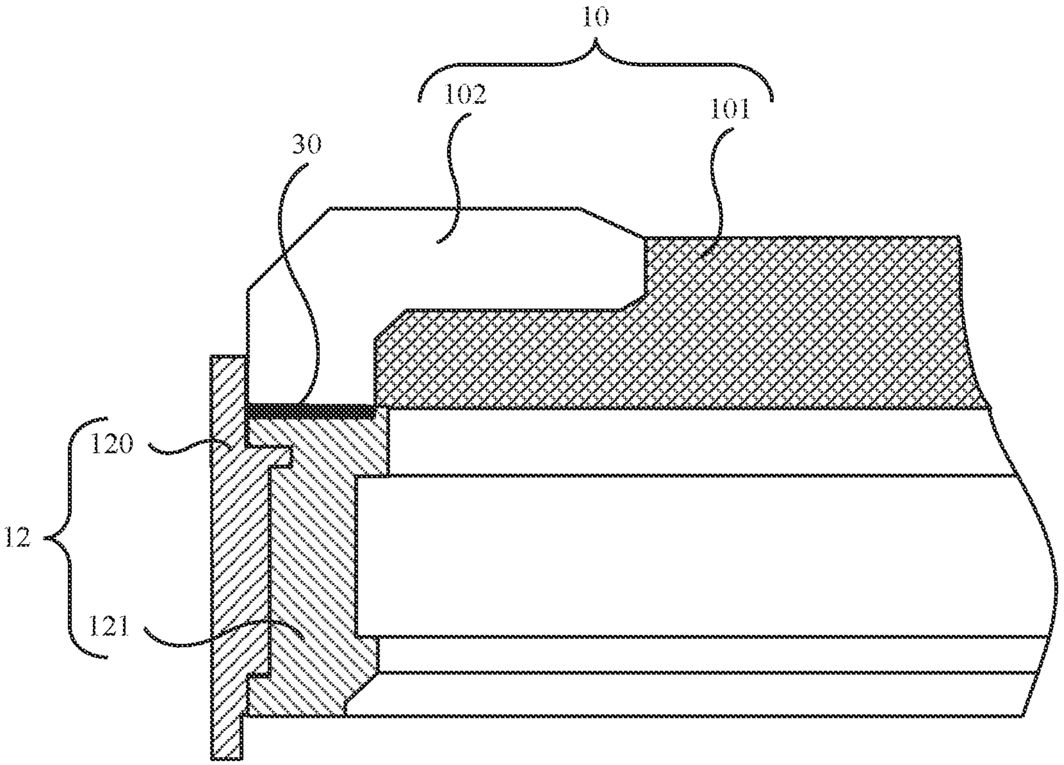
FIG. 8*a* is a schematic diagram of a partial structure of a wearable product according to some embodiments of this application.

In some embodiments of this application, in order that the part that is of the plastic frame 121 and that faces the display module 10 is connected to the display module 10 in a sealing manner, as shown in FIG. 8*a* (a locally enlarged schematic diagram of an E1 position in FIG. 7*c*), the wearable product 01 further includes an adhesive layer 30.

The adhesive layer 30 is located on a surface that is of the plastic frame 121 and that faces the bezel 102 in the display module 10. The adhesive layer 30 is used to bond opposite surfaces of the plastic frame 121 and the bezel 102.

In this way, the plastic frame 121 and the bezel 102 are connected by using the adhesive layer 30, so that the plastic frame 121 is in close contact with the bezel 102. In this way, a probability that external water vapor enters into the accommodation cavity 100 from a bonding position between the plastic frame 121 and the bezel 102 can be reduced, to improve a waterproof capability of the entire wearable product 01.

Figure 8B:
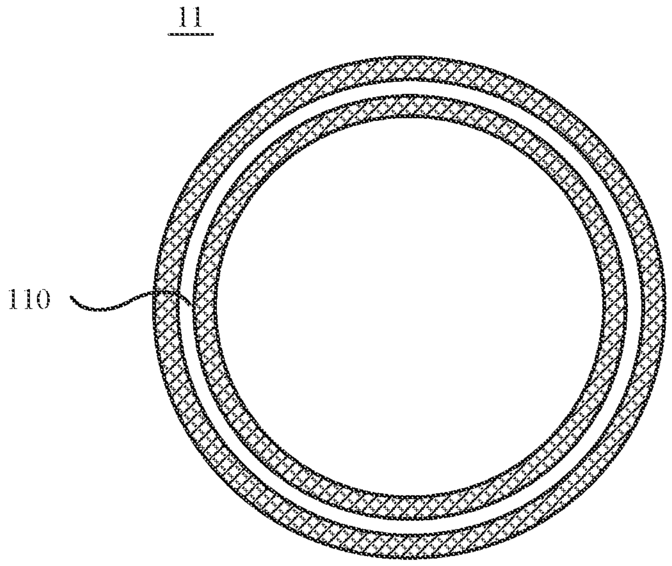
FIG. 8*b* is a schematic top view of a structure of a rear housing according to some embodiments of this application.

In some other embodiments of this application, in order that the part that is of the plastic frame 121 and that faces the rear housing 11 is connected to the rear housing 11 in a sealing manner, as shown in FIG. 8*b*, a second mounting groove 110 is disposed on a surface that is of the rear housing 11 and that faces the plastic frame 121.

Figure 8C:
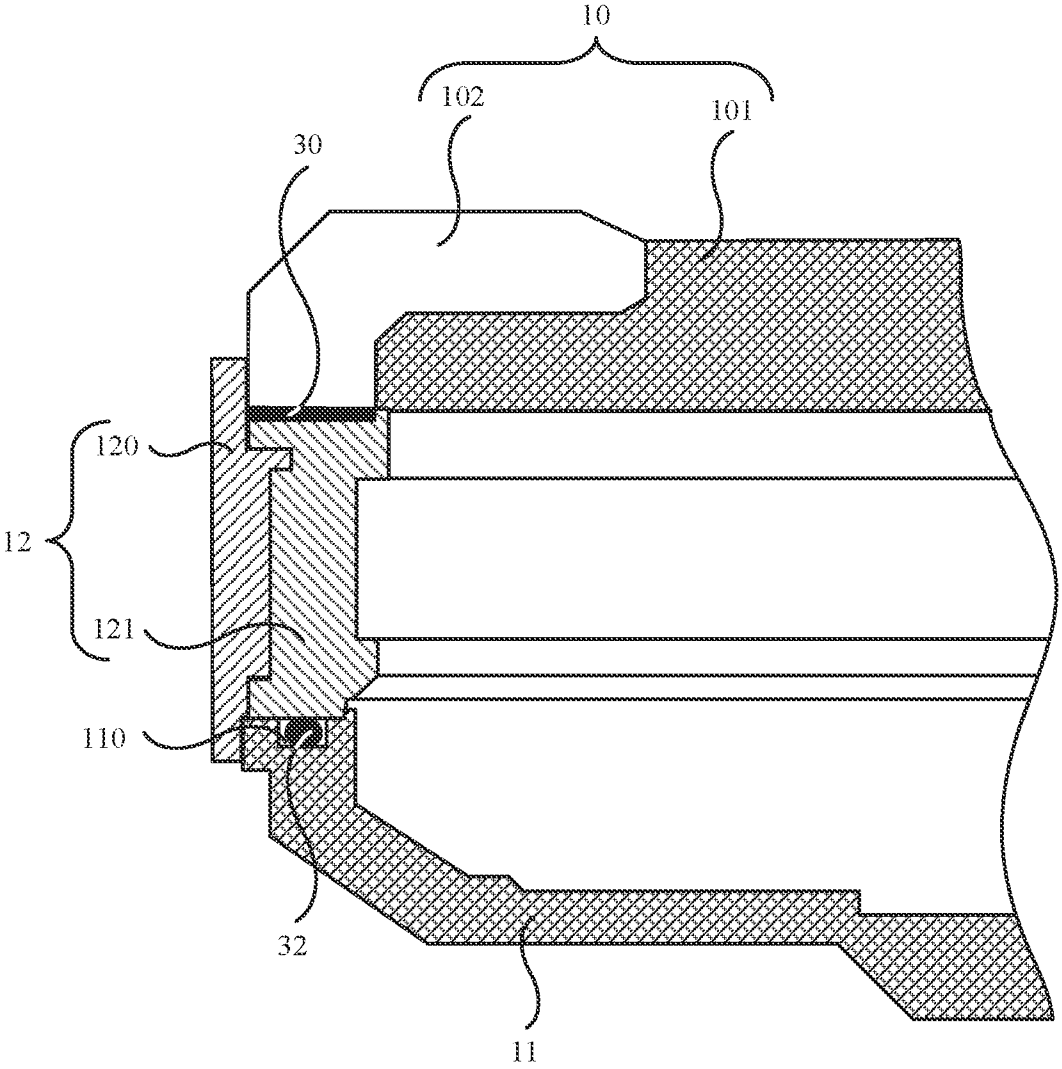
FIG. 8*c* is another schematic diagram of a partial structure of a wearable product according to some embodiments of this application.

In addition, the wearable product 01 further includes a second seal kit 32 shown in FIG. 8*c* (a locally enlarged schematic diagram of an E2 position in FIG. 7*c*).

The second seal kit 32 is located in the second mounting groove 110 and is in contact with a surface that is of the plastic frame 121 and that faces the second mounting groove 110 and a bottom surface of the second mounting groove 110. The second seal kit 32 is configured to seal the plastic frame 121 and the rear housing 11.

It should be noted that in this embodiment of this application, the second seal kit 32 may be a seal ring. When the second seal kit 32 is a seal ring, because the seal ring is an annular structure whose head and tail are connected, the second mounting groove 110 in cooperation with the second seal kit 32 is a closed ring groove shown in FIG. 8*b*.

Figure 8D:
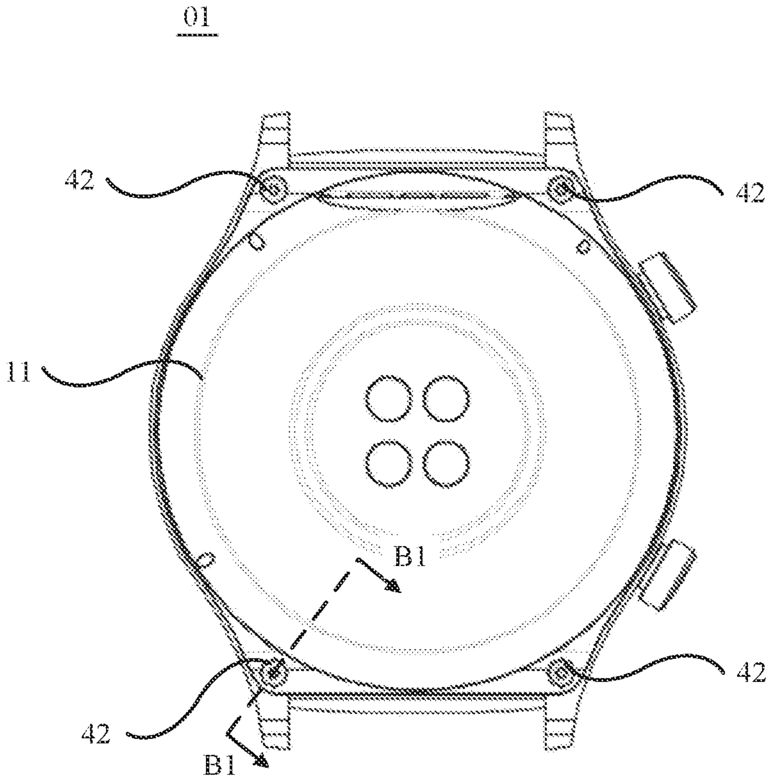
FIG. 8*d* is a top view of a back of a wearable product according to some embodiments of this application.

On this basis, in order that the plastic frame 121 can be connected to the rear housing 11 as shown in FIG. 8*d*, the wearable product 01 further includes at least one second threaded fastener 42. FIG. 8*d* is described by using an example in which the wearable product 01 includes four second threaded fasteners 42.

Figure 8E:
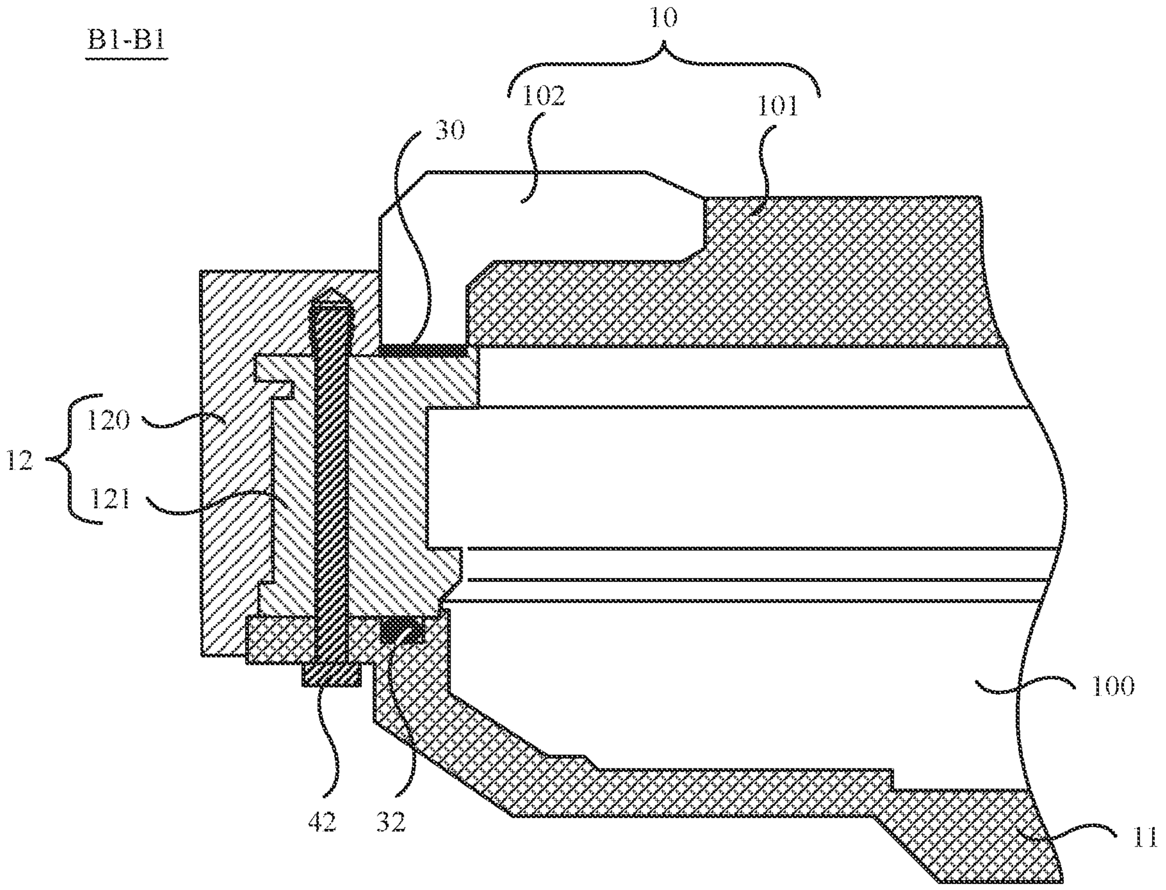
FIG. 8*e* is another cutaway drawing along B1-B1 in FIG. 8*d;*

As shown in FIG. 8*e* (a cutaway drawing along a dashed line B1-B1 in FIG. 8*d*), the second threaded fastener 42 is located on a side that is of the second seal kit 32 and that is away from the accommodation cavity 100, and the second threaded fastener 42 passes through the rear housing 11 and the plastic frame 121 to be connected to the metal frame 120 in a threaded manner.

In this case, in order that the second threaded fastener 42 can be connected to the metal frame 120 in the threaded manner, as shown in FIG. 8*e*, the metal frame 120 covers a part of the surface that is of the plastic frame 121 and that faces the display module 10. In this way, after passing through the rear housing 11 and the plastic frame 121, the second threaded fastener 42 can be connected in the screwed manner to the metal frame 120 covering the part of the plastic frame 121.

In this case, a through hole for the second threaded fastener 42 to pass through is disposed on the rear housing 11 and the plastic frame 121, and a threaded hole used for a threaded connection to the second threaded fastener 42 is disposed on the metal frame 120.

It should be noted that in some embodiments of this application, the second threaded fastener 42 may be a screw, a bolt, or the like.

In this way, the rear housing 11 may be connected to the plastic frame 121 in a sealing manner by using the second threaded fastener 42 and the second seal kit 32 located between the rear housing 11 and the plastic frame 121.

In this case, when the wearable product 01 needs to be repaired or the battery needs to be replaced, the second threaded fastener 42 may be taken out, so that the rear housing 11 can be dismounted from the middle frame 12, to repair the wearable product 01 or replace the battery.

Figure 9:
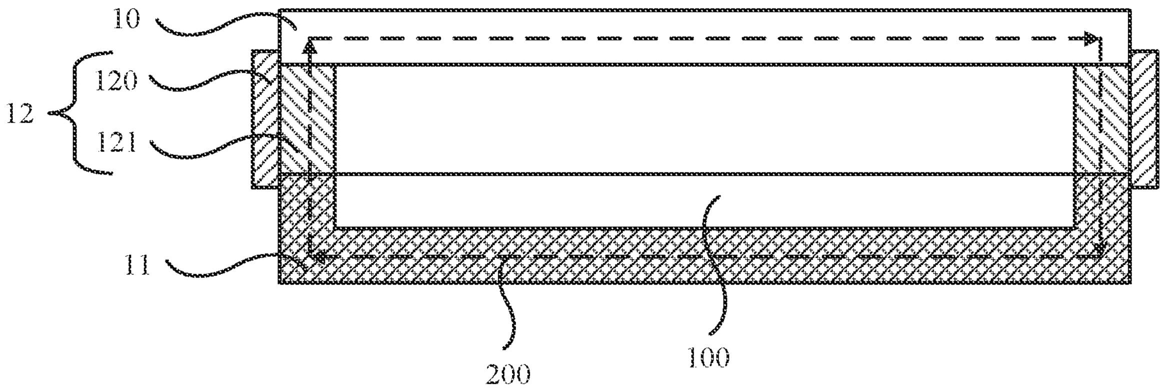
FIG. 9 is a sectional view of a wearable product according to some embodiments of this application.

It may be learned from the foregoing that, in the wearable product 01 provided in this embodiment of this application, as shown in FIG. 9, a part that is of the plastic frame 121 located on an inner side of the middle frame 12 and that faces the display module 10 is connected to the display module 10 in a sealing manner. In addition, a part that is of the plastic frame 121 and that faces the rear housing 11 is further connected to the rear housing 11 in a sealing manner. In this way, the plastic frame 121, the display module 10, and the rear housing 11 form a complete waterproof structure 200.

The waterproof structure 200 includes the plastic frame 121, the display module 10, and the rear housing 11. The accommodation cavity 100 used for accommodating the PCB 13 is in the waterproof structure 200. The metal frame 120 connected to the plastic frame 121 is outside the waterproof structure 200.

In this way, there is a risk for water leakage due to relatively small bonding force between the outer metal frame 120 and the inner plastic frame 121 in the middle frame 12. Based on a waterproof function of the waterproof structure 200 located on an inner side of the metal frame 120, a probability that external water vapor enters into the waterproof structure 200 can be effectively reduced, thereby reducing a probability of affecting another component in the accommodation cavity 100 of the wearable product 01, for example, the PCB 13, thereby improving waterproof performance of the wearable product 01.

Figure 10:
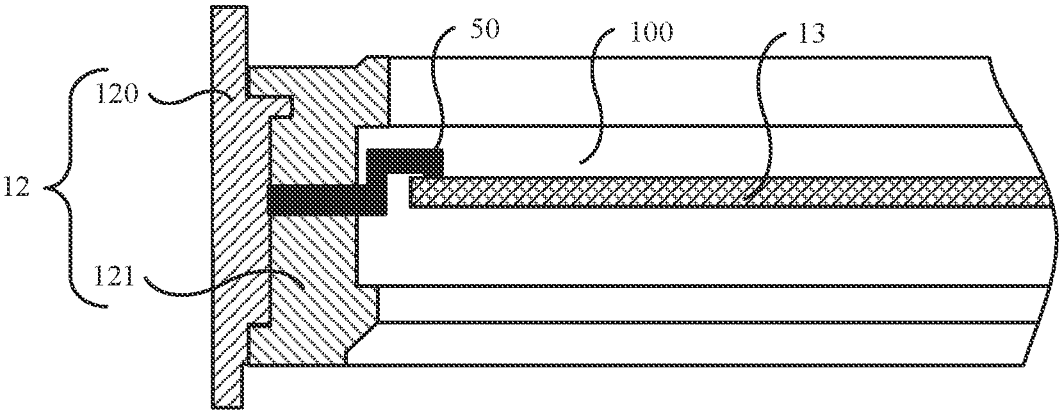
FIG. 10 is another schematic diagram of a partial structure of a wearable product according to some embodiments of this application.

In addition, the wearable product 01 further includes a conductive component 50 shown in FIG. 10. A part of the conductive component 50 is located in the accommodation cavity 100 and electrically connected to the PCB 13, and the other part of the conductive component 50 passes through the plastic frame 121 to be electrically connected to the metal frame 120. In this way, the metal frame 120 on an outer side of the middle frame 12 may be used as an antenna of the wearable product 01.

In this case, a signal on the PCB 13 can be transmitted to the outer metal frame 120 by using the conductive component 50, and the signal on the PCB 13 can be sent by using the metal frame 120.

Alternatively, the metal frame 120 may receive an external signal and transmit the signal to the PCB 13 by using the conductive component 50, so that the PCB 13 processes the signal.

In this embodiment of this application, a position in which the PCB 13 is electrically connected to the conductive component 50 may be referred to as a circuit board feedpoint. A position in which the metal frame 120 is electrically connected to the conductive component 50 may be referred to as an antenna feedpoint.

For example, in some embodiments of this application, a plurality of circuit board feedpoints are disposed on the PCB 13 of the wearable product 01. In this case, the wearable product 01 may include a plurality of conductive components 50. One conductive component 50 is electrically connected to one circuit board feedpoint on the PCB 13.

Figure 11:
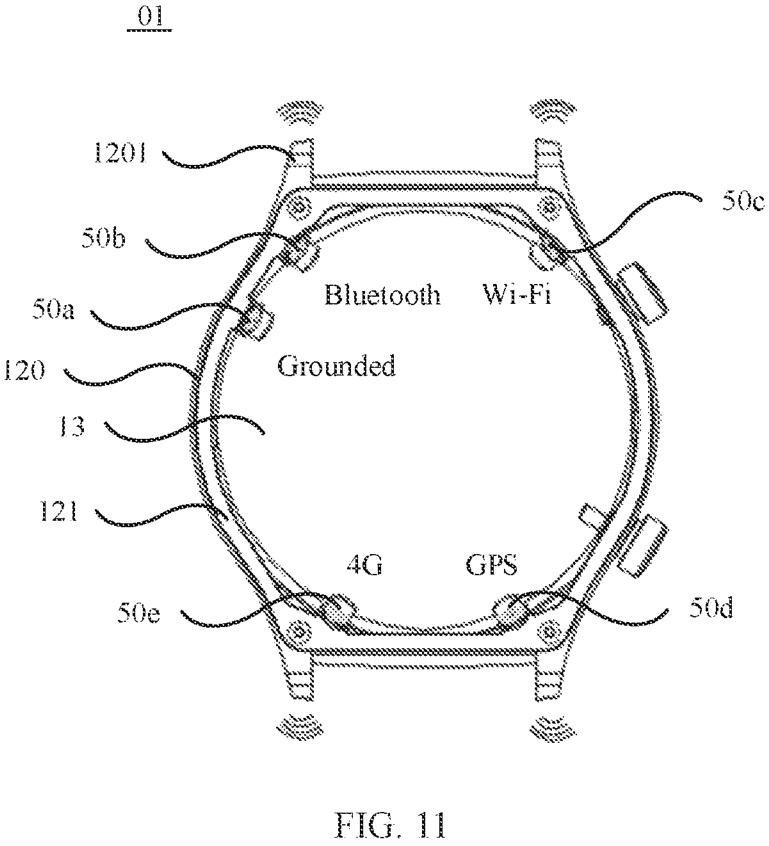
FIG. 11 is a schematic diagram of distribution of circuit board feedpoints on a PCB in a wearable product according to some embodiments of this application.

For example, as shown in FIG. 11, the plurality of conductive components are respectively a conductive component 50*a*, a conductive component 50*b*, a conductive component 50*c*, a conductive component 50*d*, and a conductive component 50*e*.

A part that is of the metal frame 120 of the middle frame 12 and that is electrically connected to the circuit board feedpoint on the PCB 13 by using the conductive component 50*b* may be used as a Bluetooth antenna to transmit a Bluetooth signal.

A part that is of the metal frame 120 and that is electrically connected to the circuit board feedpoint on the PCB 13 by using the conductive component 50*c* may be used as a Wi-Fi antenna to transmit a Wi-Fi signal.

A part that is of the metal frame 120 and that is electrically connected to the circuit board feedpoint on the PCB 13 by using the conductive component 50*d* may be used as a global positioning system (global positioning system, GPS) antenna to transmit a GPS signal.

A part that is of the metal frame 120 and that is electrically connected to the circuit board feedpoint on the PCB 13 by using the conductive component 50*e* may be used as a mobile communications antenna for transmission in mobile communications, for example, a fourth generation communications technology (4G) signal.

On this basis, the metal frame 120 protrudes outward to form four convex lugs 1201 shown in FIG. 11. The convex lugs 1201 are configured to fasten a watch band (not shown in the figure), so that the user conveniently wears the wearable product 01.

In this case, positions in which the conductive component 50*b*, the conductive component 50*c*, the conductive component 50*d*, and the conductive component 50*e* are electrically connected to the metal frame 120, that is, antenna feedpoints each may be close to one convex lug 1201 shown in FIG. 11. Therefore, transmission of antenna signals in positions of these antenna feedpoints may be improved based on a structural feature of outward protrusion of the convex lugs 1201.

In addition, in some embodiments of this application, a part that is of the metal frame 120 and that is electrically connected to the circuit board feedpoint on the PCB 13 by using the conductive component 50*a* may be used for grounding.

It may be learned from the foregoing that the metal frame 120 located on the outer side of the middle frame 12 of the wearable product 01 provided in this embodiment of this application is used as an antenna radiator. In addition, the plastic frame 121 located the inner side of the middle frame 12 is connected to the display module 10 and the rear housing 11 in a sealing manner to form the closed accommodation cavity 100. The PCB 13 and the battery are disposed in the accommodation cavity 100.

Figure 12A:
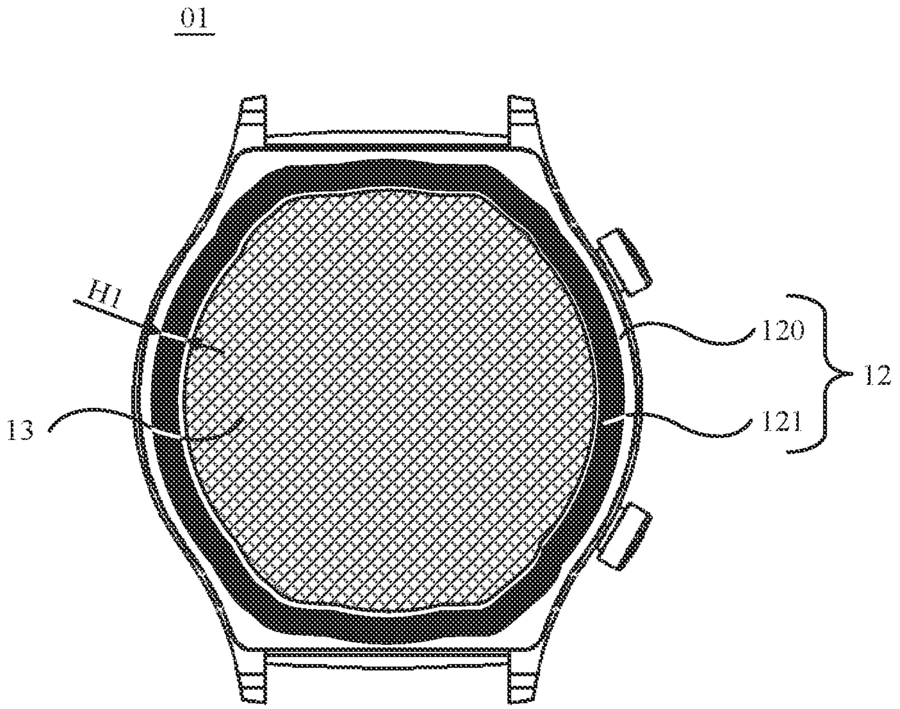
FIG. 12*a* is a schematic diagram of antenna clearance of a wearable product according to some embodiments of this application.

In this case, as shown in FIG. 12*a*, the metal frame 120 is separated from a component with a metal part inside the wearable product 01 such as the PCB 13 by using the plastic frame 121. In this way, in comparison with a solution shown in FIG. 12*b* in which only the metal frame 120 is disposed, in a solution shown in FIG. 12*a*, a distance between the metal frame 120 and an inner metal component such as the PCB 13, that is, antenna clearance can be effectively increased through adjusting a wall thickness H1 of the plastic frame 121.

In this way, greater antenna clearance indicates better antenna performance of the metal frame 120 and better transmission effect of an antenna signal, provided that a size requirement for the wearable product 01 is met.

Figure 12B:
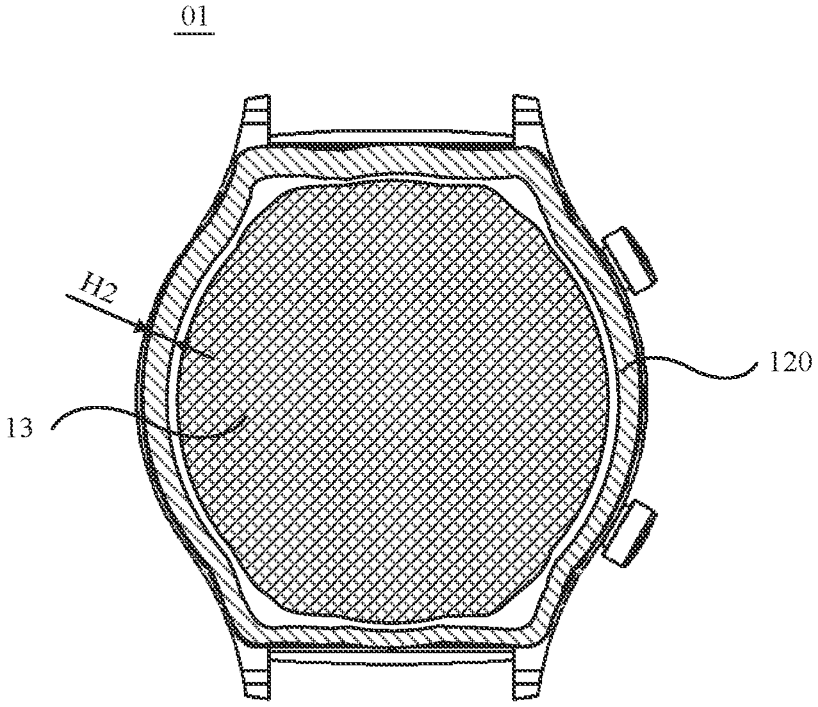
FIG. 12*b* is another schematic diagram of antenna clearance of a wearable product according to some embodiments of this application.

In the solution shown in FIG. 12*b*, when a size of the wearable product 01 is fixed, because the metal frame 120 needs to be connected to the display module 10 and the rear housing 11, a wall thickness H2 of the metal frame 120 cannot be reduced to very thin. Therefore, in the solution shown in FIG. 12*b*, it is difficult to obtain good antenna clearance.

It may be learned from the foregoing that a value of the wall thickness H1 of the plastic frame 121 may be within a range of 0.4 mm to 1.6 mm. On this basis, in some embodiments of this application, as shown in FIG. 12*a*, the wall thickness H1 of the plastic frame 121 may be about 1.0 mm. In this way, better antenna clearance can be obtained, and the outer metal frame 120 can be supported to some extent.

In addition, the metal frame 120 located on the outer side of the middle frame 12 is a hollow frame structure, and the hollow frame structure whose head and tail are connected forms a closed structure. It can be learned from the foregoing that good antenna clearance is implemented when the metal frame 120 serves as an antenna, to ensure that the wearable product 01 has good signal quality of the antenna. Therefore, when effective transmission of the antenna signal is met, the metal frame 120 may be further used to enable an appearance of the product to meet a requirement for metal integration. In addition, a part of the middle frame 12 is the metal frame 120, and another part of the middle frame is the plastic frame 121. Therefore, in comparison with a middle frame 12 fully made of metal, the middle frame 12 provided in this embodiment of this application has a lighter weight, to reduce a weight of the entire wearable product 01 and implement a light design for the entire product.

It may be learned from the foregoing that, in the wearable product 01 provided in this embodiment of this application, as shown in FIG. 9, the plastic frame 121 in the middle frame 12 is connected to the display module 10 and the rear housing 11 to form the waterproof structure 200. In addition, the wearable product 01 further includes some components. These components pass through at least the plastic frame 121 in the middle frame 12 to be connected to a component in the accommodation cavity 100. In this case, to avoid affecting the waterproof performance of the waterproof structure 200, the following uses different examples to describe in detail a structure of a component passing through at least the plastic frame 121 in the middle frame 12 and a waterproof setting manner of the component.

Example 1

In this example, a structure passing through the plastic frame 121 is the conductive component 50 shown in FIG. 10. It may be learned from the foregoing that the part of the conductive component 50 is located in the accommodation cavity 100 and electrically connected to the PCB 13 in the accommodation cavity 100, and the other part of the conductive component 50 is electrically connected to the metal frame 120.

Figure 13A:
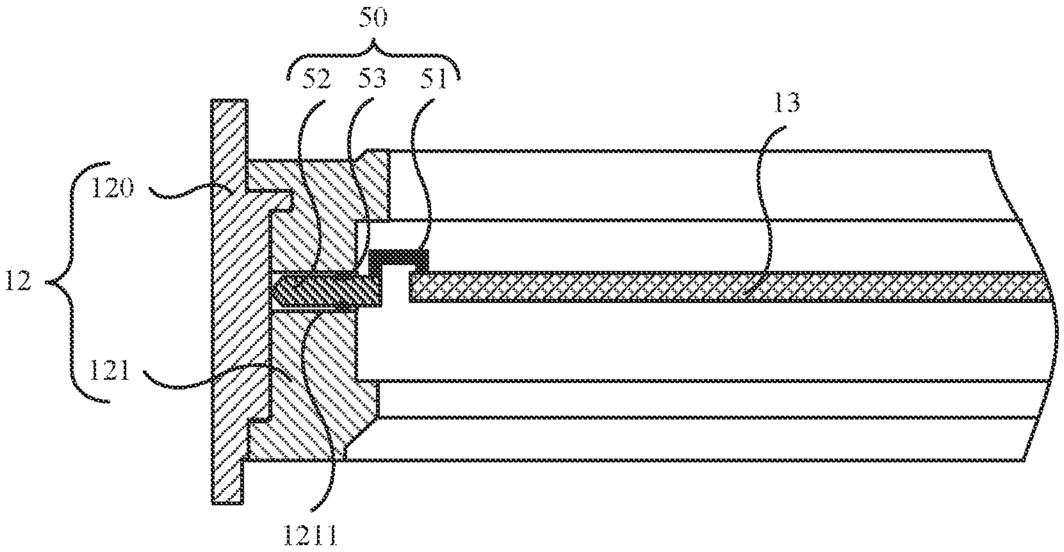
FIG. 13*a* is another schematic diagram of a partial structure of a wearable product according to some embodiments of this application.

In order that the conductive component 50 can pass through the plastic frame 121, as shown in FIG. 13*a* (a sectional view of a partial structure of the wearable product 01), a first through hole 1211 is disposed on the plastic frame 121.

As shown in FIG. 13*a*, the conductive component 50 includes a metal spring 51, a metal connector 52, and a first seal kit 53.

In some embodiments of this application, one end of the metal connector 52 passes through the first through hole 1211 to be in contact with the metal frame 120. The other end of the metal connector 52 is in contact with the metal spring 51. The other end of the metal connector 52 may be connected to the metal spring 51 by using a welding process.

In addition, an end that is of the metal spring 51 and that is away from the metal connector 52 may be in contact with the circuit board feedpoint on the PCB 13 in a welding manner.

The metal connector 52 may be a pin. Interference fit may be implemented between the pin and the first through hole 1211 on the plastic frame 121.

Figure 13B:
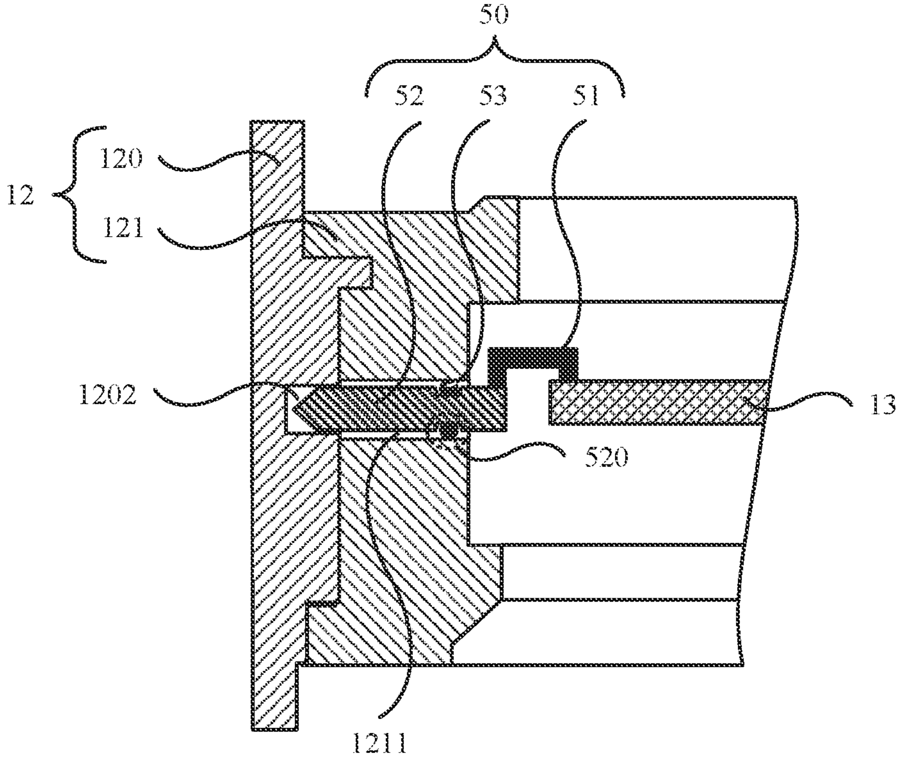
FIG. 13*b* is a schematic diagram of a structure of a conductive component in FIG. 13*a;*

Alternatively, in some other embodiments of this application, to increase a contact area between the metal connector 52 and the metal frame 120 and improve quality of an antenna signal, as shown in FIG. 13*b*, a first connection hole 1202 connected to the first through hole 1211 is disposed on the metal frame 120.

To ensure flatness and integrity of an outer surface of the metal frame 120, the first connection hole 1202 is a blind hole.

In this case, the part of the metal connector 52 extending through the first through hole 1211 may be located in the first connection hole 1202 and cooperate with the first connection hole 1202, to increase the contact area between the metal connector 52 and the metal frame 120.

For example, when the metal connector 52 is a pin, interference fit can be implemented between the pin and the first connection hole 1202.

In addition, to ensure sealing performance between the metal connector 52 and the plastic frame 121, as shown in FIG. 13*b*, a first annular mounting groove 520 is disposed on a surface that is of a part of the metal connector 52 passing through the first through hole 1211 and that cooperates with the first through hole 1211 on the plastic frame 121.

Figure 13C:
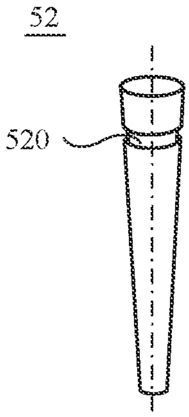
FIG. 13*c* is a schematic diagram of a structure of a metal connector in FIG. 13*b;*

When the metal connector 52 is a pin, the metal connector 52 is a pin with the first annular mounting groove 520 shown in FIG. 13*c*.

On this basis, as shown in FIG. 13*b*, the first seal kit 53 is located in the first mounting groove 520 and is in contact with a bottom surface of the first mounting groove 520 and a hole wall of the first through hole 1211.

The first seal kit 53 is configured to seal the metal connector 52 and the first through hole 1211. Therefore, an impact from the metal connector 52 passing through the plastic frame 121 can be reduced for the waterproof performance of the waterproof structure 200 including the plastic frame 121, and the display module 10 and the rear housing 11 connected to the plastic frame 121.

It should be noted that in this embodiment of this application, the first seal kit 53 may be a seal ring.

Figure 14A:
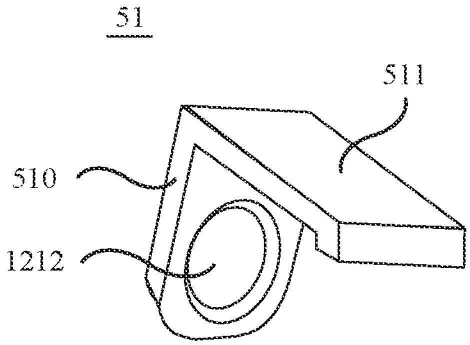
FIG. 14*a* is a schematic diagram of a structure of a metal spring in FIG. 13*a;*

In some other embodiments of this application, as shown in FIG. 14*a*, the metal spring 51 in the conductive structure 50 shown in FIG. 13*a* includes a first sub-spring 510 and a second sub-spring 511 that are connected in an integrated structure. A second through hole 1212 is disposed on the first sub-spring 510.

Figure 14B:
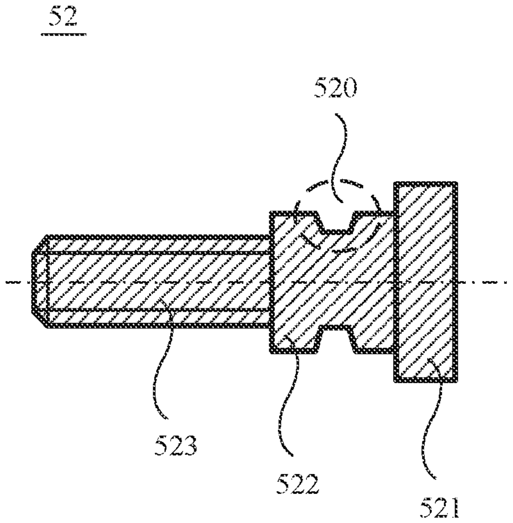
FIG. 14*b* is another schematic diagram of a structure of a metal connector in FIG. 13*a;*

In addition, the metal connector 52 in the conductive structure 50 is a first threaded fastener. The first threaded fastener may be a screw. As shown in FIG. 14*b*, the metal connector 52 serving as the first threaded fastener includes a head 521, a bare rod 522, and a screw rod 523 that are connected.

The first annular mounting groove 520 is disposed on the hare rod 522. When the metal connector 52 is a screw, the metal connector 52 is a screw with the first annular mounting groove 520.

Figure 14C:
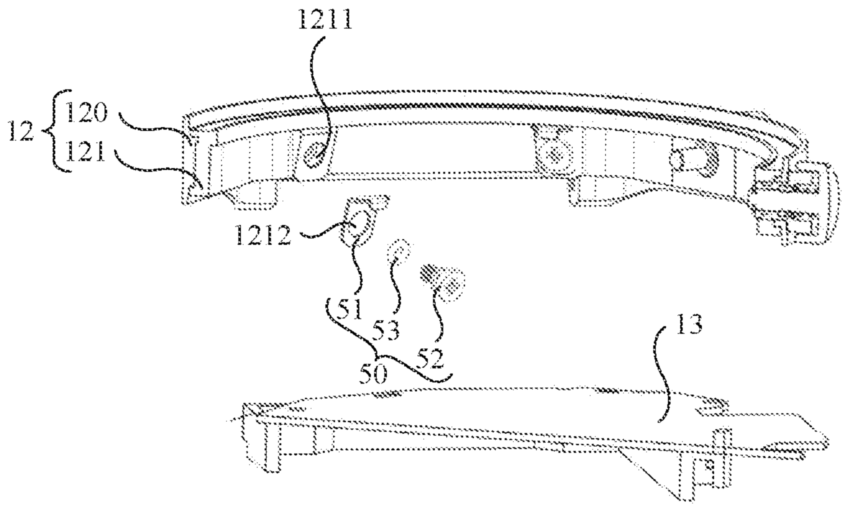
FIG. 14*c* is a schematic diagram of disposing a conductive component and a middle frame according to some embodiments of this application.

In this case, as shown in FIG. 14*c*, in a process of assembling the conductive component 50 and the plastic frame 121, the first seal kit 53 may be mounted in the first mounting groove 520 on the bare rod 522 (shown in FIG. 14*b*) in the metal connector 52. Then, the metal connector 52 passes through the second through hole 1212 on the first sub-spring 510 (shown in FIG. 14*a*) in the metal spring 51, and extends into the first through hole 1211 on the plastic frame 121.

Figure 14D:
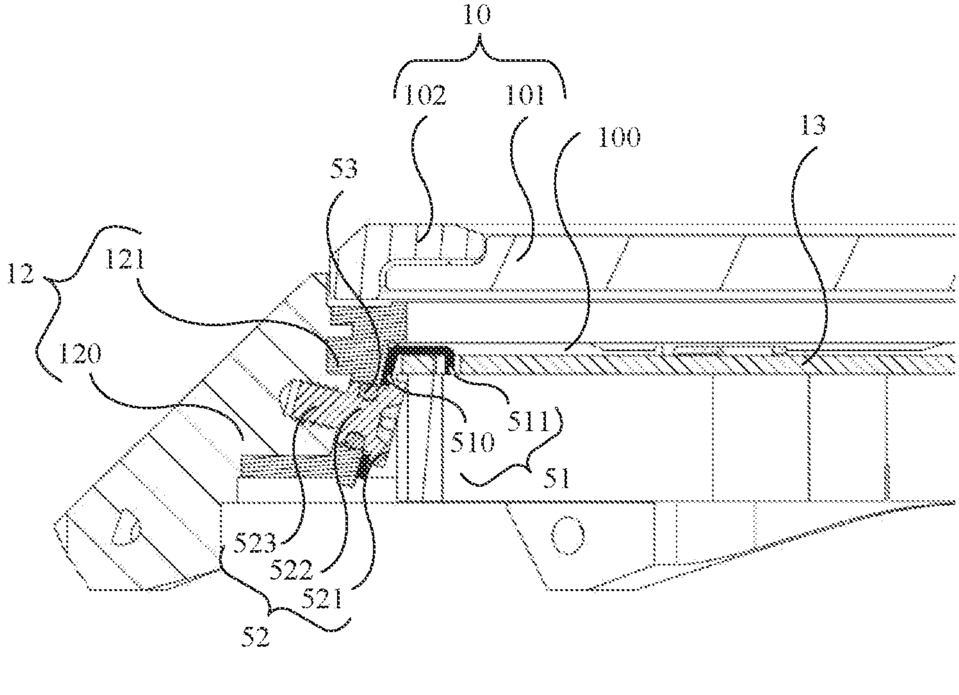
FIG. 14*d* is another schematic diagram of a structure of a conductive component in FIG. 13*a;*
Figure 14E:
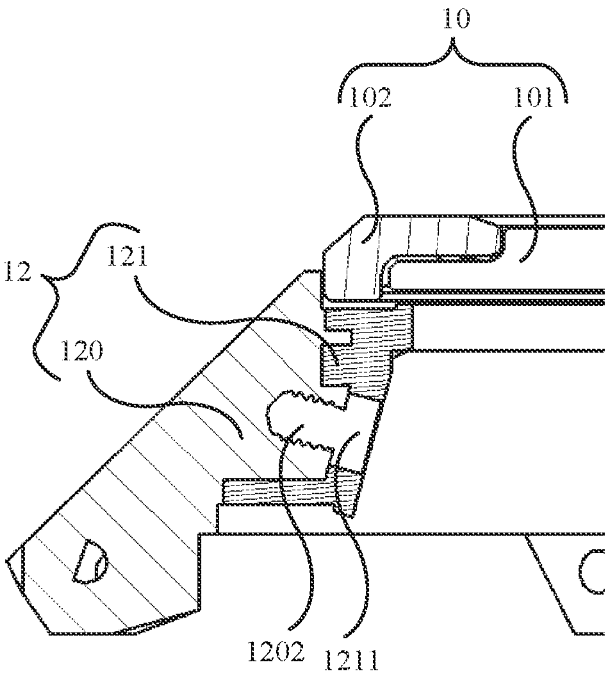
FIG. 14*e* is a schematic diagram of a structure of a first connection hole on a metal frame and a first through hole on a plastic frame in FIG. 14*d;*

After the conductive component 50 and the plastic frame 121 are assembled, as shown in FIG. 14*d*, a diameter of the head 521 of the metal connector 52 is greater than a diameter of the bare rod 522. Therefore, when the bare rod 522 passes through the first through hole 1211 (FIG. 14*e*) on the plastic frame 121, the head 521 is located in the accommodation cavity 100 located on an inner side of the plastic frame 121.

In this case, the first sub-spring 510 in the metal spring 51 may be fastened between an inner wall of the plastic frame 121 and the head 521 by using the head 521, to electrically connect the metal connector 52 to the metal spring 51.

As shown in FIG. 14*d*, an end that is away from the first sub-spring 510 and that is of the second sub-spring 511 that forms the integrated structure with the first sub-spring 510 extends into the accommodation cavity 100 and is welded to the PCB 13.

In addition, the bare rod 522 in the metal connector 52 passes through the second through hole 1212 on the first sub-spring 510 in FIG. 14*a*, and cooperates with the first through hole 1211 (FIG. 14*e*) on the plastic frame 121. In this case, the first seal kit 53 located in the first mounting groove 520 on the bare rod 522 is in contact with the bottom surface of the first mounting groove 520 and the hole wall of the first through hole 1211. The first seal kit 53 is configured to seal the metal connector 52 and the first through hole 1211, to improve the waterproof performance of the wearable product 01.

On this basis, the first connection hole 1202 on the metal frame 120 may be a threaded hole. The screw rod 523 of the metal connector 52 passes through the first through hole 1211 on the plastic frame 121 and cooperates with the first connection hole 1202 (FIG. 14*e*) on the metal frame 120 in a threaded manner, so that the metal connector 52 is electrically connected to the metal frame 120.

In addition, in the metal connector 52, the diameter of the bare rod 522 may be greater than the diameter of the screw rod 523, so that an intersection face between the bare rod 522 and the screw rod 523 can be in contact with an inner wall that is of the metal frame 120 and that faces the accommodation cavity 100. In this way, the bare rod 522 is prevented from being screwed into the first connection hole 1202 (FIG. 14*e*) on the metal frame 120.

In conclusion, when the conductive component 50 uses the structure shown in FIG. 14*d*, in the conductive component 50, one end of the metal connector 52 is screwed into the first connection hole 1202 on the metal frame 120 in a threaded connection manner, and the other end of the metal connector 52 is connected to the first sub-spring 510 fastened between the head 521 of the metal connector 52 and the plastic frame 121. In addition, the first sub-spring 510 and the second sub-spring 511 welded to the PCB 13 are the integrated structure. In this way, the metal frame 120 can be electrically connected to the PCB 13 by using the conductive component 50.

Example 2

Figure 15A:
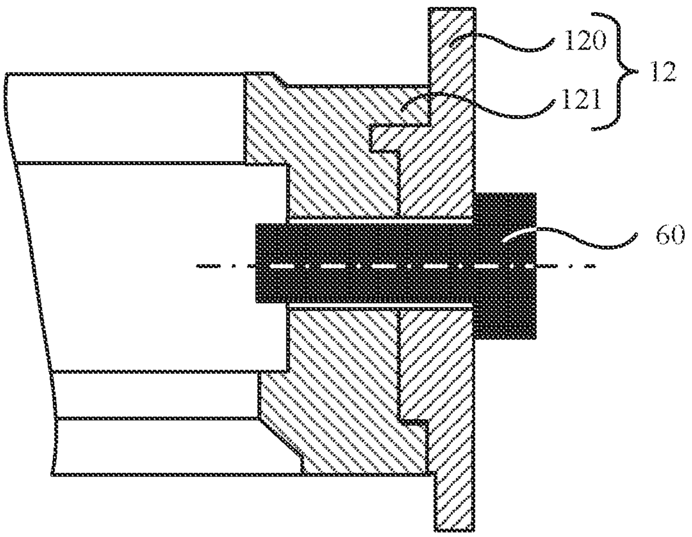
FIG. 15*a* is another schematic diagram of a partial structure of a wearable product according to some embodiments of this application.

In this example, the wearable product 01 further includes a button component 60 shown in FIG. 15*a* (a cutaway drawing along a dashed line A1-A1 in FIG. 1*a*).

When a user performs different operations such as a press operation or a rotation operation and the wearable product 01 executes an instruction corresponding to these operations, the button component 60 may be used to implement control on the watch, for example, adjust time and read information.

Figure 15B:
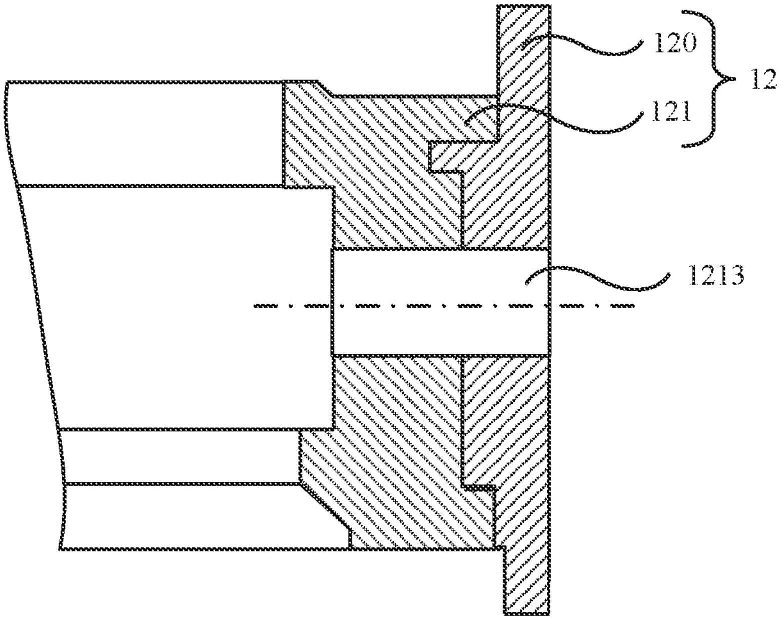
FIG. 15*b* is a schematic diagram of a structure of a button component in FIG. 15*a;*

The button component 60 passes through the middle frame 12. In this case, as shown in FIG. 15*b*, a third through hole 1213 passing through the metal frame 120 and the plastic frame 121 is disposed on the middle frame 12.

Figure 16A:
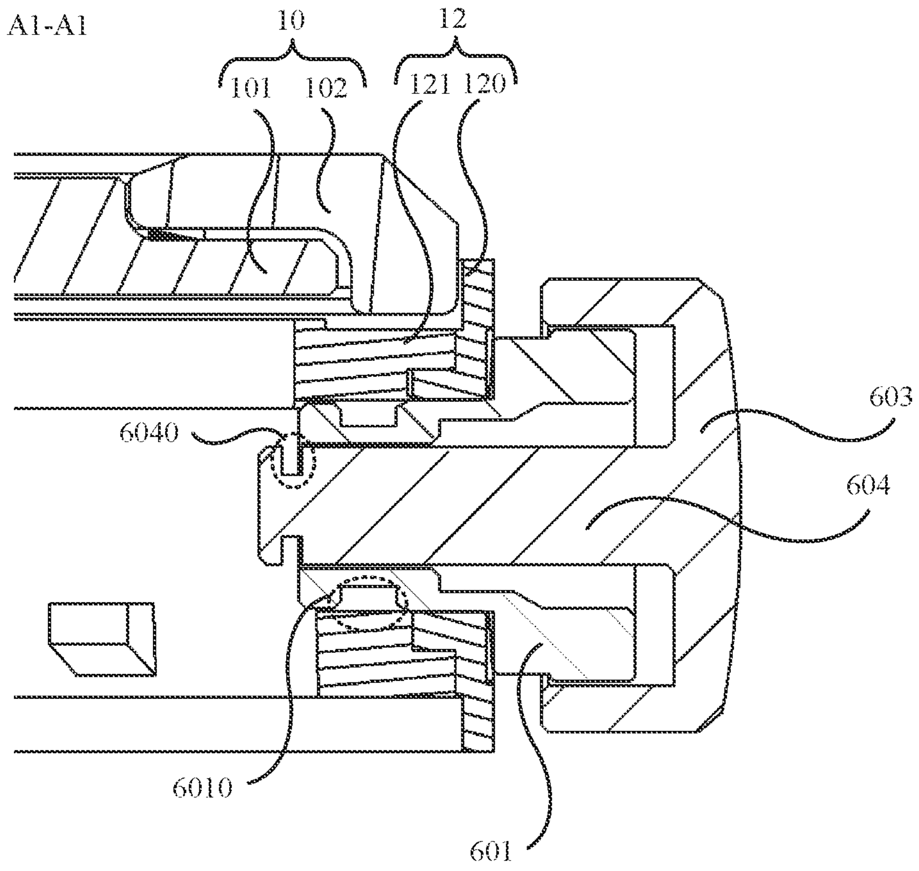
FIG. 16*a* is another schematic diagram of a structure of a button component in FIG. 15*a;*

The button component 60 includes a button tube 601, a button cap 603, and a button pole 604 shown in FIG. 16*a*.

A part of the button tube 601 is located in the third through hole 1213 (FIG. 15*b*), and a part of the button tube 601 is located on the outer side of the middle frame 12.

The button cap 603 is nested on a part that is of the button tube 601 and that is located on the outer side of the middle frame 12. The button pole 604 passes through an inner hole of the button tube 601 and is connected to the button tube 601 and the button cap 603.

In this embodiment of this application, the button pole 604 and the button cap 603 may be an integrated structure that may be formed by using a molding technology.

Figure 16B:
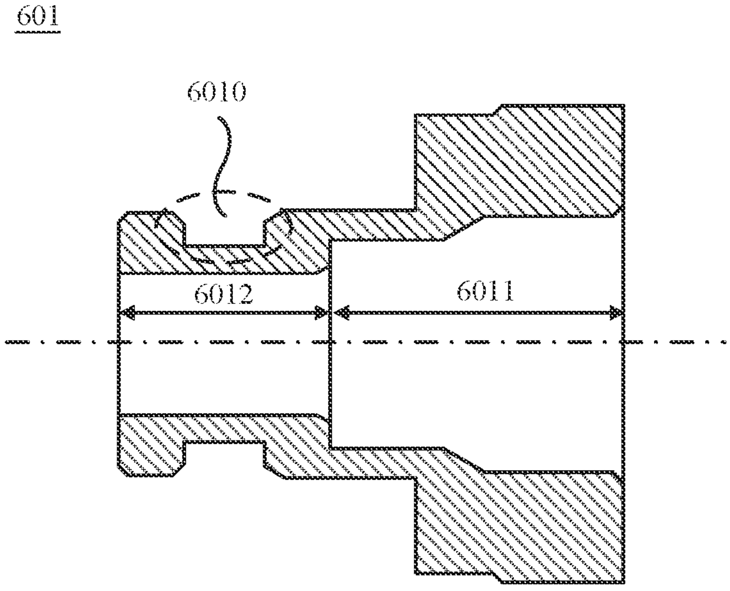
FIG. 16*b* is a schematic diagram of a structure of an inner hole of a button tube in FIG. 16*a;*

As shown in FIG. 16*b*, the inner hole of the button tube 601 includes a first inner sub-hole 6011 and a second inner sub-hole 6012 that are connected. An aperture of the first inner sub-hole 6011 is greater than an aperture of the second inner sub-hole 6012. The first inner sub-hole 6011 is disposed near the button cap 603 (FIG. 16*a*).

Figure 16C:
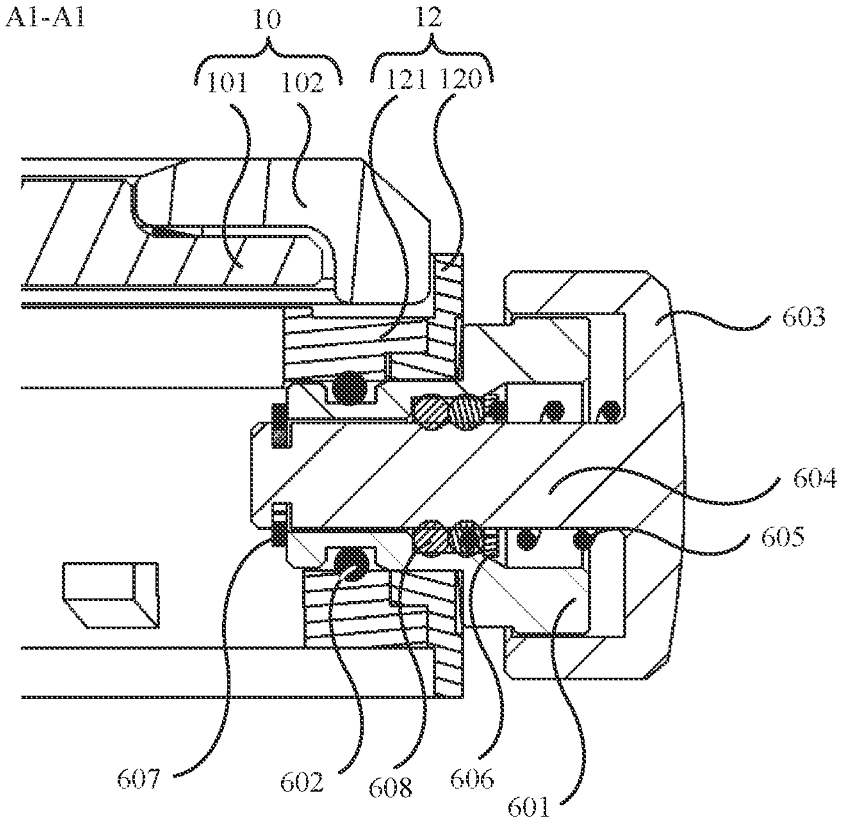
FIG. 16*c* is another schematic diagram of a structure of a button component in FIG. 15*a*.

In this case, the button component 60 further includes a spring 605 and a steel sheet 606 shown in FIG. 16*c*.

The spring 605 is mounted on the button pole 604 and located in the first inner sub-hole 6011 shown in FIG. 16*b*. When the user presses the button cap 603, pressure exerted on the button cap 603 causes the spring 605 to be deformed. When the pressure disappears, the button component 60 is reset to a position before the pressure, after the spring 605 is restored from the deformation.

The steel sheet 606 is located between the spring 605 (FIG. 16*c*) and an intersection face between the second inner sub-hole 6012 and the first inner sub-hole 6011 shown in FIG. 16*b*. A fourth through hole (not shown in the figure) for the button pole 604 to pass through is disposed on the steel sheet 606.

The steel sheet 606 has a large rigidity, to avoid scratching an inner wall of the button tube 601 during the deformation of the spring 605 under the pressure.

A third annular mounting groove 6010 shown in FIG. 16*b* is disposed on a surface that is of the button tube 601 and that cooperates with the third through hole 1213.

Figure 16D:
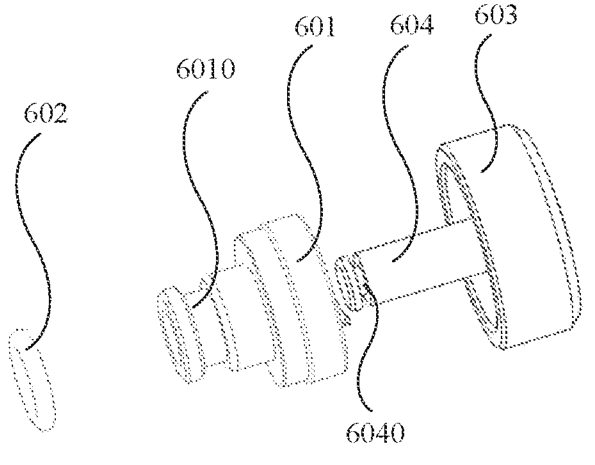
FIG. 16*d* is a schematic diagram of assembling some components in FIG. 16*c*.

In this case, the button component 60 further includes a third seal kit 602. In a process of assembling the button component 60, as shown in FIG. 16*d*, the button pole 604 may pass through the inner hole of the button tube 601. In addition, the third seal kit 602 is disposed in the third mounting groove 6010 on an outer surface of the button tube 601.

Then, as shown in FIG. 16*c*, the assembled component in FIG. 16*d* is mounted in the third through hole 1213 (FIG. 16*b*) on the middle frame 12, so that the third seal kit 602 is in contact with a bottom surface of the third mounting groove 6010 (FIG. 16*b*) and a hole wall of a part of the third through hole 1213 (FIG. 15*b*) passing through the plastic frame 121.

In this way, the button tube 601 and the plastic frame 121 may be sealed by using the third seal kit 602. Therefore, an impact from the button tube 601 passing through the plastic frame 121 can be reduced for the waterproof performance of the waterproof structure 200 including the plastic frame 121, and the display module 10 and the rear housing 11 connected to the plastic frame 121.

It should be noted that in this embodiment of this application, the third seal kit 602 may be a seal ring.

In addition, in order that the button pole 604 is connected to the button tube 601, as shown in FIG. 16*a*, a fourth annular mounting groove 6040 is disposed on an outer surface of a part of the button pole 604 extending into the accommodation cavity 100 on a side that is of the plastic frame 121 and that is opposite to the metal frame 120.

In this case, the button component 60 further includes a clip ring 607 shown in FIG. 16*c*. When the button pole 604 extends into the accommodation cavity 100, the clip ring 607 may be mounted in the fourth mounting groove 6040. A surface that is of the clip ring 607 and that faces a side wall of the middle frame 12 is in contact with the plastic frame 121 and a side surface of the fourth mounting groove 6040. Therefore, positions of the button pole 604 and the button tube 601 are fixed by using the clip ring 607.

In addition, to seal the button pole 604 and the inner hole of the button tube 601, the button component 60 further includes at least one fourth seal kit 608 shown in FIG. 16*c*. The fourth seal kit 608 may be disposed on the button pole 604, and is in contact with a stepped surface formed in an intersection position between the first inner sub-hole 6011 and the second inner sub-hole 6012 of the button tube 601 (FIG. 16*b*).

It should be noted that in this embodiment of this application, the fourth seal kit 608 may be a seal ring.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A wearable product, comprising:

a display system comprising a non-light-emitting side;

a rear housing located on the non-light-emitting side;

a middle frame located between the display system and the rear housing and comprising:

a metal frame; and a plastic frame nested in the metal frame and connected to the metal frame, wherein the metal frame and the plastic frame are hollow frame structures, wherein the plastic frame is connected to the display system and the rear housing in a sealing manner to form an accommodation cavity, wherein a surface of the metal frame and that faces the plastic frame is a first stepped surface, wherein a surface of the plastic frame and that faces the metal frame is a second stepped surface, and wherein the first stepped surface cooperates with the second stepped surface;

a printed circuit board (PCB) located in the accommodation cavity; and a conductive component comprising a first part and a second part, wherein the first part is located in the accommodation cavity and electrically connected to the PCB, and wherein the second part passes through the plastic frame to be electrically connected to the metal frame.

2. The wearable product of claim 1, further comprising a first through hole disposed on the plastic frame, wherein the conductive component further comprises:

a metal spring in contact with the PCB;

a metal connector comprising a first end and a second end, wherein the first end passes through the first through hole to be in contact with the metal frame, wherein the second end is in contact with the metal spring, and wherein a first annular mounting groove is disposed on a part of the metal connector passing through the first through hole and that cooperates with the first through hole; and a first seal kit located in the first mounting groove and in contact with a bottom surface of the first mounting groove and a hole wall of the first through hole, wherein the first seal kit is configured to seal the metal connector and the first through hole.

3. The wearable product of claim 2, further comprising a first connection hole connected to the first through hole and disposed on the metal frame, wherein the part of the metal connector, extending through the first through hole, is located in the first connection hole and cooperating with the first connection hole.

4. The wearable product of claim 2, wherein the first stepped surface has at least one first protrusion and at least one first groove, wherein the second stepped surface has at least one second protrusion and at least one second groove, wherein the first protrusion is clamped into the second groove, and wherein the second protrusion is clamped into the first groove.

5. The wearable product of claim 2, wherein a surface of the metal frame that faces the plastic frame has a plurality of nano-holes filled with a part of the plastic frame.

6. The wearable product of claim 2, wherein a plurality of circuit board feedpoints are disposed on the PCB, wherein the wearable product further comprises a plurality of conductive components, and wherein one of the conductive components is electrically connected to one of the circuit board feedpoints.

7. The wearable product of claim 3, wherein the first connection hole is a threaded hole, wherein the metal connector is a first threaded fastener comprising a bare rod and a screw rod connected to the bare rod, wherein the bare rod cooperates with the first through hole in the sealing manner, wherein the screw rod cooperates with the first connection hole in a threaded manner, and wherein a diameter of the bare rod is greater than a diameter of the screw rod.

8. The wearable product of claim 7, wherein the first threaded fastener further comprises a head located in the accommodation cavity and connected to the bare rod, and wherein the metal spring comprises:

a first sub-spring provided with a second through hole, wherein the bare rod passes through the second through hole to fasten the first sub-spring between the head and the plastic frame; and a second sub-spring connected to the first sub-spring to be an integrated structure, wherein the second sub-spring is in contact with the PCB.

9. The wearable product of claim 3, wherein the first stepped surface has at least one first protrusion and at least one first groove, wherein the second stepped surface has at least one second protrusion and at least one second groove, wherein the first protrusion is clamped into the second groove, and wherein the second protrusion is clamped into the first groove.

10. The wearable product of claim 3, wherein a surface of the metal frame that faces the plastic frame has a plurality of nano-holes filled with a part of the plastic frame.

11. The wearable product of claim 3, wherein a plurality of circuit board feedpoints are disposed on the PCB, wherein the wearable product further comprises a plurality of conductive components, and wherein one of the conductive components is electrically connected to one of the circuit board feedpoints.

12. The wearable product of claim 1, wherein the display system further comprises a display screen and a bezel disposed around a periphery of the display screen, wherein the wearable product further comprises an adhesive layer located on a surface of the plastic frame facing the bezel, and wherein the adhesive layer is used to bond the plastic frame and the bezel.

13. The wearable product of claim 1, wherein a second mounting groove is disposed on a surface of the rear housing facing the plastic frame, and wherein the wearable product further comprises:

a second seal kit located in the second mounting groove, is in contact with the plastic frame facing a bottom surface of the second mounting groove, and configured to seal the plastic frame and the rear housing; and a second threaded fastener located on a side of the second seal kit and that is away from the accommodation cavity, wherein the second threaded fastener passes through the rear housing and the plastic frame to be connected to the metal frame in a threaded manner.

14. The wearable product of claim 1, wherein a wall thickness of the plastic frame is 0.4 millimeters (mm) to 1.6 mm.

15. The wearable product of claim 1, wherein the wearable product further comprises:

a third through hole disposed on the middle frame; and a button component comprising:

a button tube, wherein a first part of the button tube is located in the third through hole, wherein a second part of the button tube is located on an outer side of the middle frame, and wherein a third annular mounting groove is disposed on a surface of the button tube and that cooperates with the third through hole; and a third seal kit located in the third mounting groove and in contact with a bottom surface of the third mounting groove and a hole wall of a part of the third through hole passing through the plastic frame, wherein the third seal kit is configured to seal the button tube and the third through hole.

16. The wearable product of claim 15, wherein the button component further comprises:

a button cap nested on the second part; and a button pole passing through an inner hole of the button tube and connected to the button tube and the button cap.

17. The wearable product of claim 16, wherein the inner hole comprises a first inner sub-hole and a second inner sub-hole that are connected, wherein an aperture of the first inner sub-hole is greater than an aperture of the second inner sub-hole, wherein the first inner sub-hole is disposed near the button cap, wherein a fourth annular mounting groove is disposed on a cylinder surface of a part of the button pole extending into the accommodation cavity, and wherein the button component further comprises:

a spring mounted on the button pole and located in the first inner sub-hole;

a steel sheet located between the spring and an intersection face between the second inner sub-hole and the first inner sub-hole, wherein a fourth through hole is disposed on the steel sheet for the button pole to pass through; and a clip ring mounted in the fourth annular mounting groove, wherein a surface of the clip ring faces a side wall of the middle frame and a side surface of the annular fourth mounting groove.

18. The wearable product of claim 1, wherein the first stepped surface has at least one first protrusion and at least one first groove, wherein the second stepped surface has at least one second protrusion and at least one second groove, wherein the first protrusion is clamped into the second groove, and wherein the second protrusion is clamped into the first groove.

19. The wearable product of claim 1, wherein a surface of the metal frame that faces the plastic frame has a plurality of nano-holes filled with a part of the plastic frame.

20. The wearable product of claim 1, wherein a plurality of circuit board feedpoints are disposed on the PCB, wherein the wearable product further comprises a plurality of conductive components, and wherein one of the conductive components is electrically connected to one of the circuit board feedpoints.

* * * * *